United States Patent
Holbrook et al.

(10) Patent No.: US 12,211,074 B2
(45) Date of Patent: Jan. 28, 2025

(54) LOCATION-ENABLED COLLECTABLE TRADING TOOL

(71) Applicant: S&P Holbrook, LLC, West Jordan, UT (US)

(72) Inventors: Shawn Holbrook, West Jordan, UT (US); Paige Holbrook, West Jordan, UT (US)

(73) Assignee: S&PHolbrook, LLC, West Jordan, UT (US)

( * ) Notice: Subject to any disclaimer, the term of this patent is extended or adjusted under 35 U.S.C. 154(b) by 0 days.

(21) Appl. No.: 18/326,868

(22) Filed: May 31, 2023

(65) Prior Publication Data
US 2023/0306483 A1 Sep. 28, 2023

Related U.S. Application Data

(62) Division of application No. 17/737,807, filed on May 5, 2022, now Pat. No. 11,694,246.

(60) Provisional application No. 63/184,205, filed on May 5, 2021.

(51) Int. Cl.
G06Q 30/00 (2023.01)
G06Q 30/0601 (2023.01)
H04W 4/021 (2018.01)
G06Q 10/087 (2023.01)

(52) U.S. Cl.
CPC ..... *G06Q 30/0611* (2013.01); *G06Q 30/0641* (2013.01); *H04W 4/021* (2013.01); *G06Q 10/087* (2013.01)

(58) Field of Classification Search
CPC .................. G06Q 30/0611; G06Q 30/0641
See application file for complete search history.

(56) References Cited

U.S. PATENT DOCUMENTS

| | | |
|---|---|---|
| 2004/0044593 A1 | 3/2004 | May |
| 2004/0133927 A1 | 7/2004 | Sternberg et al. |
| 2007/0088652 A1 | 4/2007 | Firmage et al. |
| 2008/0065514 A1* | 3/2008 | Eaton ............... G06Q 30/02 705/27.1 |
| 2012/0043864 A1 | 2/2012 | Brandes |

(Continued)

OTHER PUBLICATIONS

Case, Donald O. "A model of the information seeking and decision making of online coin buyers." Information Research 15.4 (2010).*

(Continued)

*Primary Examiner* — Kathleen Palavecino
(74) *Attorney, Agent, or Firm* — VLP Law Group LLP; Michel Bohn

(57) ABSTRACT

An example system and method may provide a location-enabled collectable trading tool. An example system may receive, by a graphical user interface displayed on a first client device, initial collection attributes describing an item collection, where the item collection is associated with a first user in a database stored in a computer-accessible memory. The system may also determine an attribute of an item associated with the item collection and determine a trade eligibility of the item. In some instances, the system may identify a second user based on the attribute, the trade eligibility of the item, and an attribute of the second user. The system may then automatically provide communication between the first client device and a second client device associated with the identified second user.

20 Claims, 30 Drawing Sheets

(56) References Cited

U.S. PATENT DOCUMENTS

| | | |
|---|---|---|
| 2013/0117269 A1 | 5/2013 | Sacco et al. |
| 2014/0343851 A1 | 11/2014 | Michael |
| 2014/0365307 A1* | 12/2014 | Cheung .............. G06Q 30/0261 |
| | | 705/14.58 |
| 2016/0078514 A1 | 3/2016 | Kim et al. |
| 2017/0046793 A1* | 2/2017 | Domey .............. G06Q 30/0635 |
| 2021/0382935 A1* | 12/2021 | Huang .................. G06F 16/583 |

OTHER PUBLICATIONS

International Preliminary Report on Patentability of Intl. application No. PCT/US2022/027908, mailed Oct. 24, 2023 (9 pages).
International Search Report and Written Opinion of Intl. application No. PCT/US2022/027908, mailed Oct. 31, 2022 (20 pages).
Case, Donald 0., "A model of the information seeking and decision making of online coin buyers." Information Research 15.4, Dec. 2010 (13 pages).

\* cited by examiner

LOCATION-ENABLED COLLECTABLE TRADING TOOL

BACKGROUND

The present disclosure relates to a system for location-based trading of items. Some implementations relate to an adaptable mobile graphical user interface that automatically matches nearby users.

The trading of collectable items, such as trading cards, pins, and other items is a common hobby. Typically, collectors meet each other either at pre-established events for trading items or via means, such as internet forums relating to the collectables. Such methods of connecting collectors does not easily allow items to be exchanged and does not facilitate automatic identification and communication of the collectable items with other collectors.

Furthermore, previous methods of communication and matching between collectors required significant back and forth communication and wasted time and computing resources. These methods often lead to users spending substantial amounts of time reviewing websites, blogs, or contacting other users without necessarily finding another collector with the right items or needs. Similarly, suggested meetups were not limited to geographic locations, such as amusement parks or conferences. Accordingly, a technical solution is needed to address the many shortcomings of previous methods and technologies.

SUMMARY

An improved location-enabled collectable trading tool can be configured to perform particular operations or actions by virtue of having software, firmware, hardware, or a combination of them installed on the system that in operation causes or cause the system to perform the actions. One general aspect of the system includes a method that includes: receiving, by a graphical user interface displayed on a first client device, initial collection attributes describing a first item collection, the first item collection being associated with a first user in one or more databases stored in one or more computer-accessible memories; determining, by one or more processors, a first attribute of a first item associated with the first item collection; determining, by the one or more processors, a trade eligibility of the first item; identifying, by the one or more processors, a second user based on the first attribute, the trade eligibility of the first item, and an attribute of the second user; and providing, by the one or more processors, communication between the first client device and a second client device of the second user. The operations of the method may be performed, for example, by one or more processors executing instructions stored on one or more non-transitory computer-accessible memories.

In some implementations, the method may include that determining the first attribute of the first item includes scanning, by an optical sensor of the first client device, the first item; comparing the initial attribute of the first item against an item database in the one or more computer-accessible memories; identifying one or more candidate items based on the comparison of the initial attribute with the item database; receiving a user input, via the graphical user interface, confirming an identity of the first item from among the one or more candidate items; and determining the first attribute of the first item based on the received user input confirming the identity of the first item; that determining the trade eligibility of the first item includes: receiving a user input tagging the first item as trade eligible; receiving geographical data from a location sensor of the first client device; and setting the first item as trade eligible based on the user input and the geographical data identifying the first client device being within a geofenced area.

The method may include that identifying the second user includes: receiving geographical data from a location sensor of the second client device of the second user; determining that the second client device is within a geofenced area based on the geographical data; and determining that the first client device is within the geofenced area; that identifying the second user includes: determining a second item requested by the first user via an input into the graphical user interface; determining one or more items in a second item collection associated with the second user in the one or more databases in the one or more computer-accessible memories; and determining that the second item is among the one or more items in the second item collection based on the one or more databases.

In some instances, the method may include that enabling communication between the first client device and the second client device includes automatically providing, by the one or more processors, a location of the first client device to the second client device in response to the first client device and the second client device being within a geofenced area and a trade acknowledgement by the first user and the second user; that enabling communication between the first client device and the second client device includes processing a back-end transaction for a trade of the first item; and automatically updating, by the one or more processors, the one or more databases in the one or more computer-accessible memories to reflect an update to the first item collection; that the first item includes an enamel pin; and where the method further includes receiving, by an optical sensor of the first client device, an image of the first item; processing the image of the first item to determine a query vector; matching the query vector against a database in the one or more computer-accessible memories describing a plurality of items to determine a candidate item; receiving a user input from the first user via the graphical user interface, the user input confirming that the first item matches the candidate item; retrieving data describing the candidate item from the database; adding the first item to the first item collection associated with the first user using the data describing the candidate item; and automatically matching the first item with the second user based on the trade eligibility.

Another general aspect of the technology may include a method that includes: receiving, by an optical sensor of a client device, an image of an enamel pin; processing the image of the enamel pin to determine a query vector; matching the query vector against a database describing a plurality of items to determine a candidate pin; receiving a user input from a user via a graphical user interface, the user input confirming that the enamel pin matches the candidate pin; retrieving data describing the candidate pin from the database; adding the enamel pin to an enamel pin collection associated with the user using the data describing the candidate pin; determining that the enamel pin is trade eligible based on one or more of a user input and a geographical location of the client device; and automatically matching the enamel pin with a second user based on one or more of the trade eligibility, the geographical location of the client device, an attribute of the second user.

In some implementations, the method may include: that determining, based on one or more geographic location sensors of the client device, that the client device is within a determined geographical area; that automatically matching the enamel pin with the second user includes determining that a second client device of the second user is in the determined geographical area; and receiving, by a graphical user interface displayed on the client device, initial collection attributes describing the enamel pin collection, the enamel pin collection being associated with the first user in the database; determining a first attribute of the enamel pin associated with the enamel pin collection; identifying the second user based on the first attribute, the trade eligibility of the enamel pin, and an attribute of the second user; and providing communication between the client device and a second client device of the second user.

Other embodiments of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIGS. 7A-7F illustrate example graphical user interfaces for adding items and item attributes to a collection, such as by scanning the item and entering details about the item.

FIGS. 10A-10J illustrate example graphical user interfaces for reviewing a user's orders, profile information, and marketplace.

DESCRIPTION

The present disclosure relates to a tool for location-based collectable trading. For instance, the technology described herein efficiently identifies collectable items, such as enamel pins, and organizes digital representations along with information about the items. In some implementations, the technology facilitates exchanging or trading collectable items. For instance, implementations of the technology may determine, based on geolocation services (e.g., GPS, Bluetooth™ beacons, cell tower, etc.) when collectors are within defined regions where trades are allowed. For instance, the technology may facilitate trades of collectable items among individuals in a theme park, trade show, event, or other venue.

Implementations of the technology generate a database of collectable items and their attributes. The technology may receive data describing a certain item, such as a photograph of the item, and intelligently identify the item based on attributes of the item in the photograph matched against the generated database.

These and other features are described in further detail in reference to the figures below. The features and advantages described herein are not all-inclusive and many additional features and advantages are within the scope of the present disclosure. Moreover, it should be noted that the language used in the present disclosure has been principally selected for readability and instructional purposes, and not to limit the scope of the subject matter disclosed herein.

With reference to the figures, reference numbers may be used to refer to example components found in any of the figures, regardless of whether those reference numbers are shown in the figure being described. Further, where a reference number includes a letter referring to one of multiple similar components (e.g., component 000a, 000b, and 000n), the reference number may be used without the letter to refer to one or all of the similar components.

Figure 1:
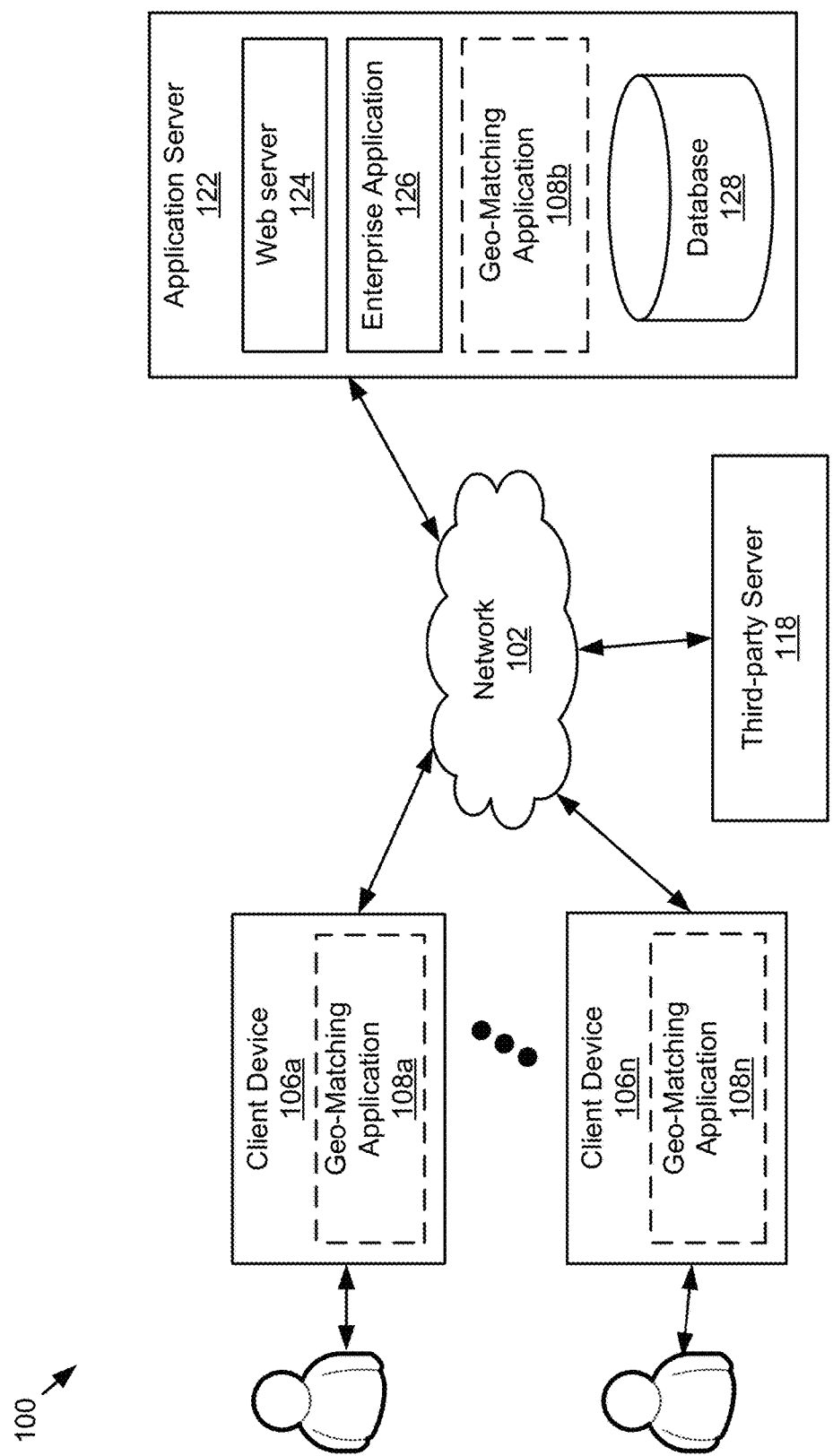
FIG. 1 illustrates an example network diagram of a computing system for providing a location-enabled collectable trading tool.

FIG. 1 is a block diagram of an example system 100 for providing a location-enabled collectable trading tool. The illustrated system 100 may include client devices 106a . . . 106n, which may run instances of the geo-matching application 108a . . . 108n, a third-party server 118, and an application server 122, which are electronically communicatively coupled via a network 102 for interaction with one another, although other system configurations are possible including other devices, systems, and networks. For example, the system 100 could include any number of client devices 106, third-party servers 118, application servers 122, and other systems and devices.

The network 102 may include any number of networks and/or network types. For example, the network 102 may include, but is not limited to, one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The client device (s) 106 includes one or more computing devices having data processing and communication capabilities. The client device 106 may couple to and communicate with other client devices 106 and the other entities of the system 100 via the network 102 using a wireless and/or wired connection, such as the application server 122.

Examples of client devices 106 may include, but are not limited to, mobile phones, wearables, tablets, laptops, desktops, netbooks, server appliances, servers, virtual machines, TVs, etc. The system 100 may include any number of client devices 106, including client devices 106 of the same or different type.

A plurality of client devices 106a . . . 106n are depicted in FIG. 1 to indicate that the application server 122 and its components may aggregate information about and provide data associated with the systems and processes described herein to a multiplicity of users on a multiplicity of client devices 106a . . . 106n, for example, as described in reference to various users and client devices 106 described in reference to FIGS. 2-10J herein. In some implementations, a single user may use more than one client device 106, which the application server 122 may use to track and aggregate interaction data associated with the user through a variety of different channels including online, physical, and phone (e.g., text, voice, etc.) channels, as discussed elsewhere herein. In some implementations, multiple users may use multiple client devices 106 and the geo-matching application 108, whether on a client device 106 and/or on an application server 122 (or another component of the application server 122) may provide interaction and functionality described herein. In some implementations, the application server 122 may communicate with and provide information to a client device 106.

In some implementations, the geo-matching application 108 may send information to another computing device, for example, to an application server 122 or third-party server 118. For example, the geo-matching application 108 may determine certain information (e.g., item or pin details) and communicate with various devices based on those details. For instance, the geo-matching application 108 may scan an item using an optical scanner on a client device 106, process the scan either on the client device 106 or by transmitting it to an application server 122, and then the application server 122 may match the scanned item against a database of scanned items. In some instances, the application server 122 may crawl other websites, forums, or databases (e.g., hosted by a third-party server 118) to identify the scanned item. The components or instance of the geo-matching application 108 executed on a first client device 106a may receive the attributes of the item and then match with a second client device 106n (e.g., via communication using the application server 122) to determine a match and, in some instances, execute a trade, as described in further detail below.

The application server 122 may include a web server 124, an enterprise application 126, a geo-matching application 108, and a database 128. In some configurations, the enterprise application 126 and/or geo-matching application 108b may be distributed over the network 102 on disparate devices in disparate locations or may reside on the same locations, in which case the client device 106a and/or the application server 122 may each include an instance of the geo-matching application 108 and/or portions thereof. The client devices 106 may also store and/or operate other software such as a geo-matching application 108, an operating system, other applications, etc., that are configured to interact with the application server 122 via the network 102.

The application server 122 and the third-party server 118 have data processing, storing, and communication capabilities, as discussed elsewhere herein. For example, the servers 122 and/or 118 may include one or more hardware servers, server arrays, storage devices and/or systems, etc. In some implementations, the servers 122 and/or 118 may include one or more virtual servers, which operate in a host server environment.

In some implementations, the enterprise application 126 may receive communications from a client device 106 in order to perform the functionality described herein. The enterprise application 126 may receive information and provide information to the geo-matching application 108 to generate the adaptable graphical interfaces described herein, as well as perform and provide analytics and other operations. In some implementations, the enterprise application 126 may perform additional operations and communications based on the information received from client devices 106, as described elsewhere herein.

The database 128 may be stored on one or more information sources for storing and providing access to data, such as the data storage device 208. The database 128 may store data describing client devices 106, instances of the geo-matching application 108, customers, items, collections, collection boards, geo-fences, trade histories, etc., such as described herein.

A third-party server 118 can host services such as a third-party application (not shown), which may be individual and/or incorporated into the services provided by the application server 122. For example, the third-party server 118 may represent one or more item databases, forums, company websites, etc. For instance, the third-party server 118 may provide collectable item attributes, images, analysis or processing services, location services, or other data and services.

It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
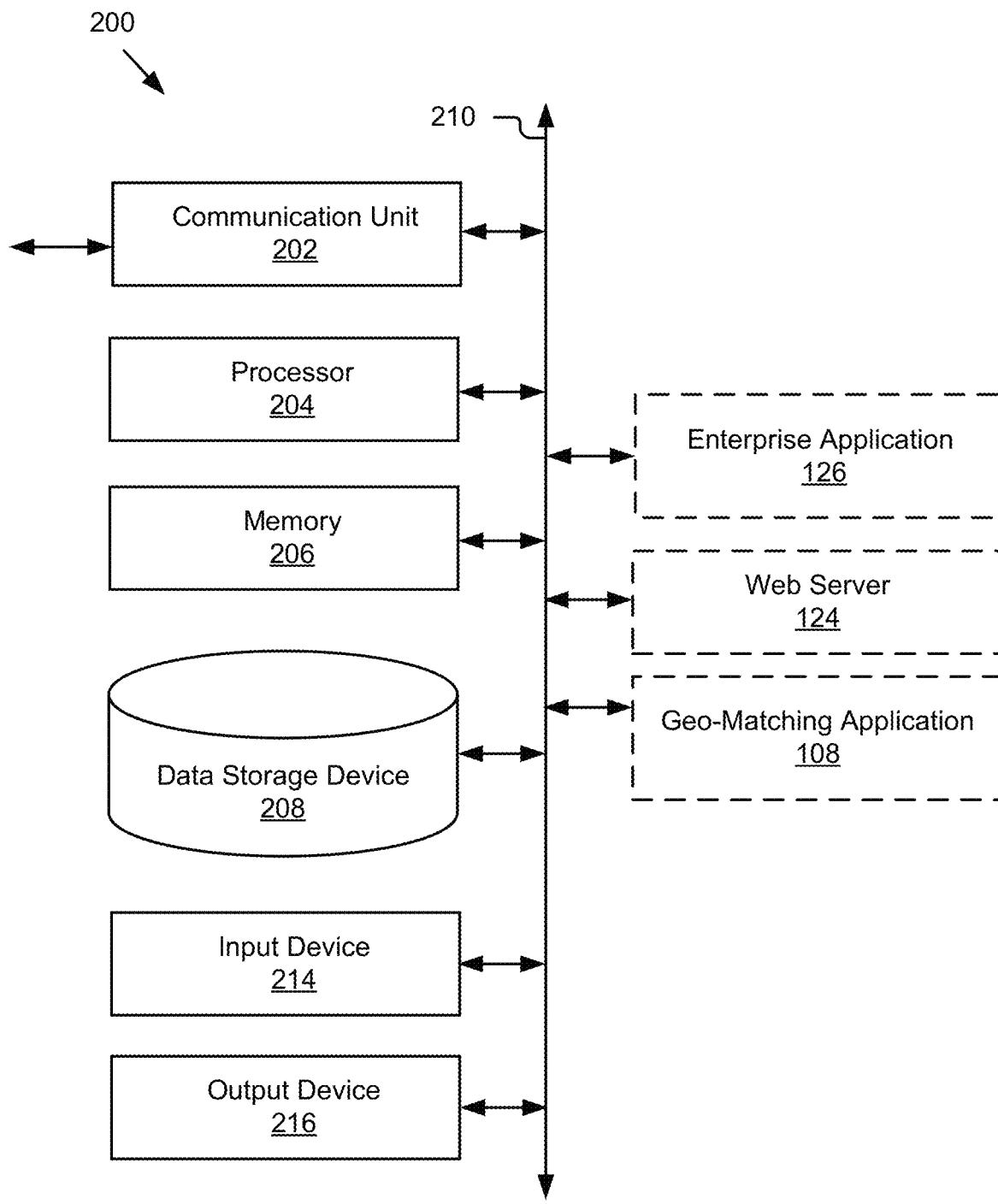
FIG. 2 illustrates an example computing device, which may perform the operations of the geo-matching application.

FIG. 2 is a block diagram of an example computing system 200, which may represent the computer architecture of a client device 106, third-party server 118, application server 122, and/or another device described herein, depending on the implementation. In some implementations, as depicted in FIG. 2, the computing system 200 may include an enterprise application 126, a web server 124, a geo-matching application 108, or another application, depending on the configuration. For instance, a client device 106 may include a geo-matching application 108 (which could incorporate various aspects of the enterprise application 126, in some implementations); and the application server 122 may include the web server 124, the enterprise application 126, and/or components thereof, although other configurations are also possible and contemplated.

The enterprise application 126 includes computer logic executable by the processor 204 to perform operations discussed elsewhere herein. For instance, the enterprise application 126 may be coupled to the data storage device 208 to store, retrieve, and/or manipulate data stored therein and may be coupled to the web server 124, the geo-matching application 108, and/or other components of the system 100 to exchange information therewith.

The web server 124 includes computer logic executable by the processor 204 to process content requests (e.g., to or from a client device 106). The web server 124 may include an HTTP server, a REST (representational state transfer) service, or other suitable server type. The web server 124 may receive content requests (e.g., product search requests, HTTP requests) from client devices 106, cooperate with the enterprise application 126 to determine the content, retrieve and incorporate data from the data storage device 208, format the content, and provide the content to the client devices 106.

In some instances, the web server 124 may format the content using a web language and provide the content to a corresponding geo-matching application 108 for processing and/or rendering to the user for display. The web server 124 may be coupled to the data storage device 208 to store retrieve, and/or manipulate data stored therein and may be coupled to the enterprise application 126 to facilitate its operations.

The geo-matching application 108 includes computer logic executable by the processor 204 on a client device 106 to provide for user interaction, receive user input, present information to the user via a display, and send data to and receive data from the other entities of the system 100 via the network 102. In some implementations, the geo-matching application 108 may generate and present user interfaces based on information received from the enterprise application 126 and/or the web server 124 via the network 102. For example, a customer/user may use the geo-matching application 108 to perform the operations described herein.

As depicted, the computing system 200 may include a processor 204, a memory 206, a communication unit 202, an output device 216, an input device 214, and a data storage device 208, which may be communicatively coupled by a communication bus 210. The computing system 200 depicted in FIG. 2 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 200 may include various operating systems, sensors, additional processors, and other physical configurations. The processor 204, memory 206, communication unit 202, etc., are representative of one or more of these components.

The processor 204 may execute software instructions by performing various input, logical, and/or mathematical operations. The processor 204 may have various computing architectures to method data signals (e.g., CISC, RISC, etc.). The processor 204 may be physical and/or virtual, and may include a single core or plurality of processing units and/or cores. In some implementations, the processor 204 may be coupled to the memory 206 via the bus 210 to access data and instructions therefrom and store data therein. The bus 210 may couple the processor 204 to the other components of the computing system 200 including, for example, the memory 206, the communication unit 202, the input device 214, the output device 216, and the data storage device 208.

The memory 206 may store and provide access to data to the other components of the computing system 200. The memory 206 may be included in a single computing device or a plurality of computing devices. In some implementations, the memory 206 may store instructions and/or data that may be executed by the processor 204. For example, the memory 206 may store one or more of the enterprise application 126, the web server 124, the geo-matching application 108, and their respective components, depending on the configuration. The memory 206 is also capable of storing other instructions and data, including, for example, an operating system, hardware drivers, other software applications, databases, etc. The memory 206 may be coupled to the bus 210 for communication with the processor 204 and the other components of computing system 200.

The memory 206 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 204. In some implementations, the memory 206 may include one or more of volatile memory and non-volatile memory (e.g., RAM, ROM, hard disk, optical disk, etc.). It should be understood that the memory 206 may be a single device or may include multiple types of devices and configurations.

The bus 210 can include a communication bus for transferring data between components of a computing device or between computing devices, a network bus system including the network 102 or portions thereof, a processor mesh, a combination thereof, etc. In some implementations, the enterprise application 126, web server 124, geo-matching application 108, and various other components operating on the computing system/device 100 (operating systems, device drivers, etc.) may cooperate and communicate via a communication mechanism included in or implemented in association with the bus 210. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 202 may include one or more interface devices (I/F) for wired and wireless connectivity among the components of the system 100. For instance, the communication unit 202 may include, but is not limited to, various types known connectivity and interface options. The communication unit 202 may be coupled to the other components of the computing system 200 via the bus 210. The communication unit 202 can provide other connections to the network 102 and to other entities of the system 100 using various standard communication protocols.

The input device 214 may include any device for inputting information into the computing system 200. In some implementations, the input device 214 may include one or more peripheral devices. For example, the input device 214 may include a keyboard, a pointing device, microphone, an image/video capture device (e.g., camera), a touch-screen display integrated with the output device 216, etc. The output device 216 may be any device capable of outputting information from the computing system 200. The output device 216 may include one or more of a display (LCD, OLED, etc.), a printer, a haptic device, audio reproduction device, touch-screen display, a remote computing device, etc. In some implementations, the output device is a display which may display electronic images and data output by a processor of the computing system 200 for presentation to a user, such as the processor 204 or another dedicated processor. In some implementations, the input device 214 may include an optical scanner or sensor, such as a camera that captures images, video, or other data.

In some implementations, the communication unit 202 or input device 214 may include a location sensor, such as various radios or receivers that may be used to receive information, for example, for locating the device 200 (e.g., a client device 106). In some instances, a cellular, Wi-Fi™, or Bluetooth™ radio may be used to determine a location of a client device 106, for example, by detecting a cell tower, router, or beacon. In some instances, the input device 214 may additionally or alternatively include a GPS sensor for receiving GPS signals and determining a geographic location of the device.

The data storage device 208 may include one or more information sources for storing and providing access to data. In some implementations, the data storage device 208 may store data associated with a database management system (DBMS) operable on the computing system 200. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The data stored by the data storage device 208 may be organized and queried using various criteria including any type of data stored by them, such as in one or more databases (e.g., an item database describing items, item attributes, or collections, etc.), such as described herein. For example, the data storage device 208 may store the database 128. The data storage device 208 may include data tables, databases, or other organized collections of data. Examples of the types of data stored by the data storage device 208 may include, but are not limited to the data described with respect to the figures, for example.

The data storage device 208 may be included in the computing system 200 or in another computing system and/or storage system distinct from but coupled to or accessible by the computing system 200. The data storage device 208 can include one or more non-transitory computer-readable mediums for storing the data. In some implementations, the data storage device 208 may be incorporated with the memory 206 or may be distinct therefrom.

The components of the computing system 200 may be communicatively coupled by the bus 210 and/or the processor 204 to one another and/or the other components of the computing system 200. In some implementations, the components may include computer logic (e.g., software logic, hardware logic, etc.) executable by the processor 204 to provide their acts and/or functionality. In any of the foregoing implementations, the components may be adapted for cooperation and communication with the processor 204 and the other components of the computing system 200.

Figure 3A:
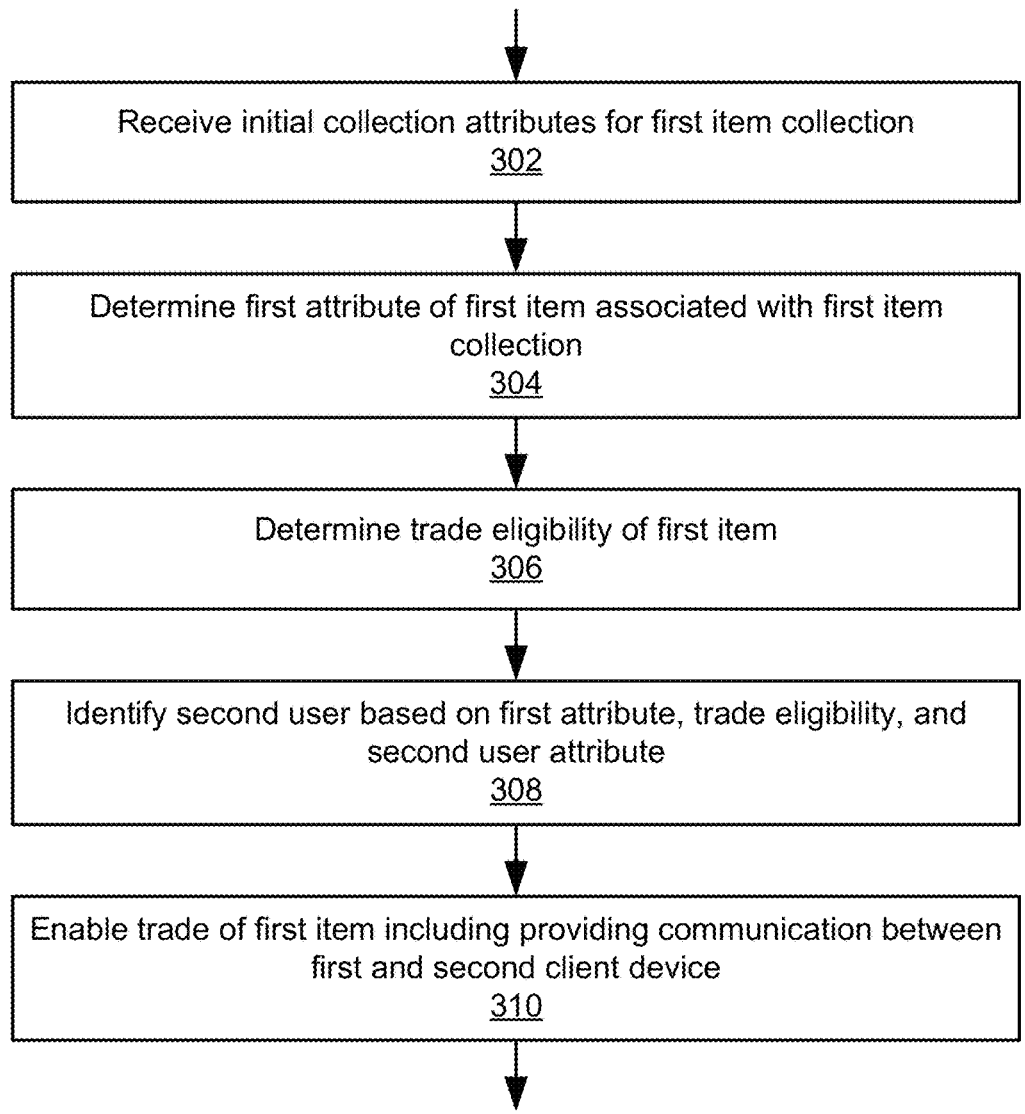
FIG. 3A is a flowchart of an example method for providing location-enabled collectable trading technology.

FIG. 3A is a flowchart of an example method 300a for providing location-enabled collectable trading technology. For example, FIG. 3A illustrates a method for identifying an item, determining its trade eligibility, and enabling a trade of the item, for example, using location services on a client device 106 that may indicate a real-time location of one or both of the users participating in the trade.

At 302, the geo-matching application 108 may receive initial collection attributes for a first item collection. For instance, a graphical user interface displayed on a first client device 106 may receive initial collection attributes describing a collection of items owned by or associated with a user. For example, a user may collect enamel pins, trading cards, patches, or various other collectable paraphernalia.

Figures 4A, 4B:
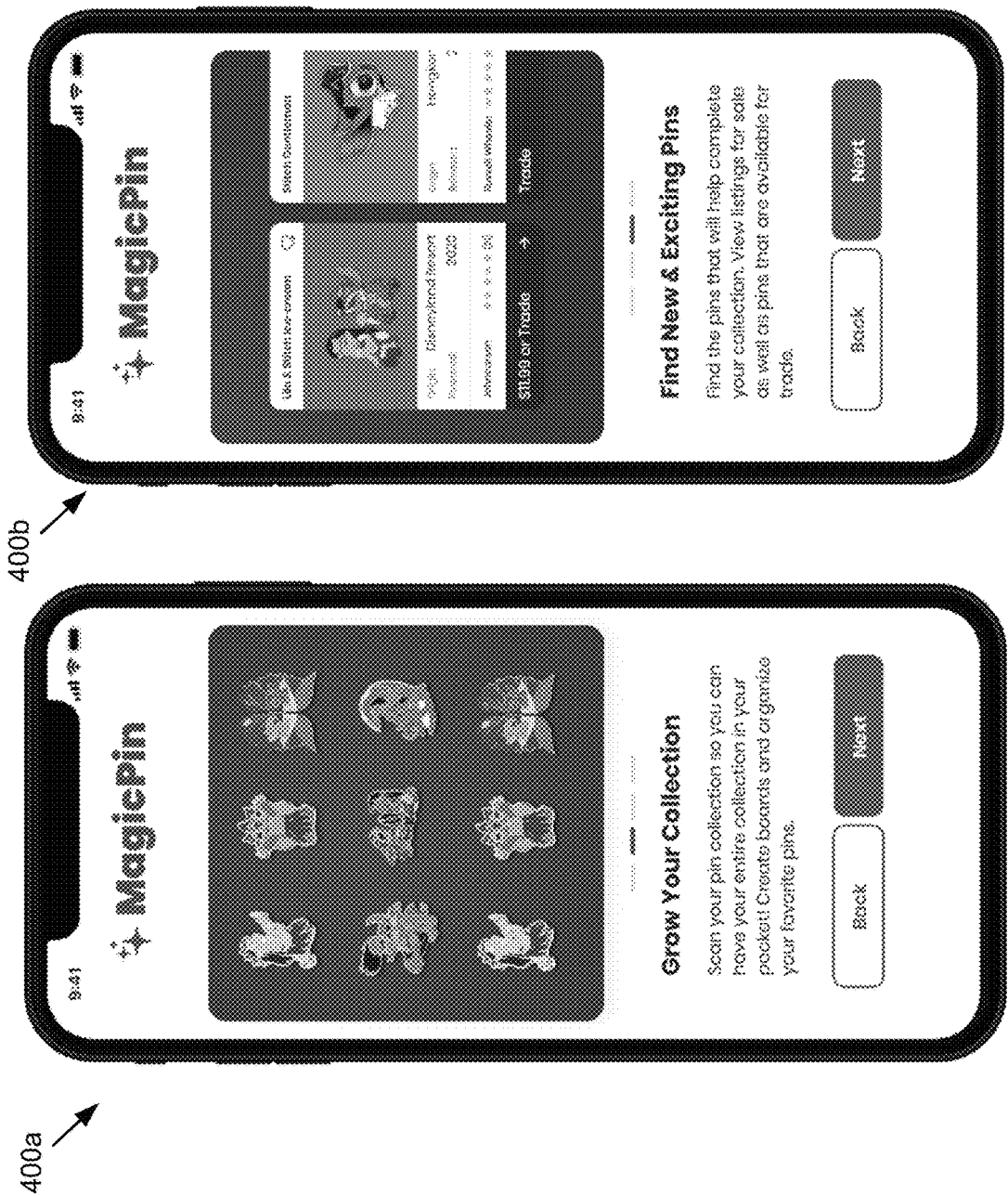
FIGS. 4A-4C illustrate example graphical user interfaces for onboarding a user.
Figure 4C:
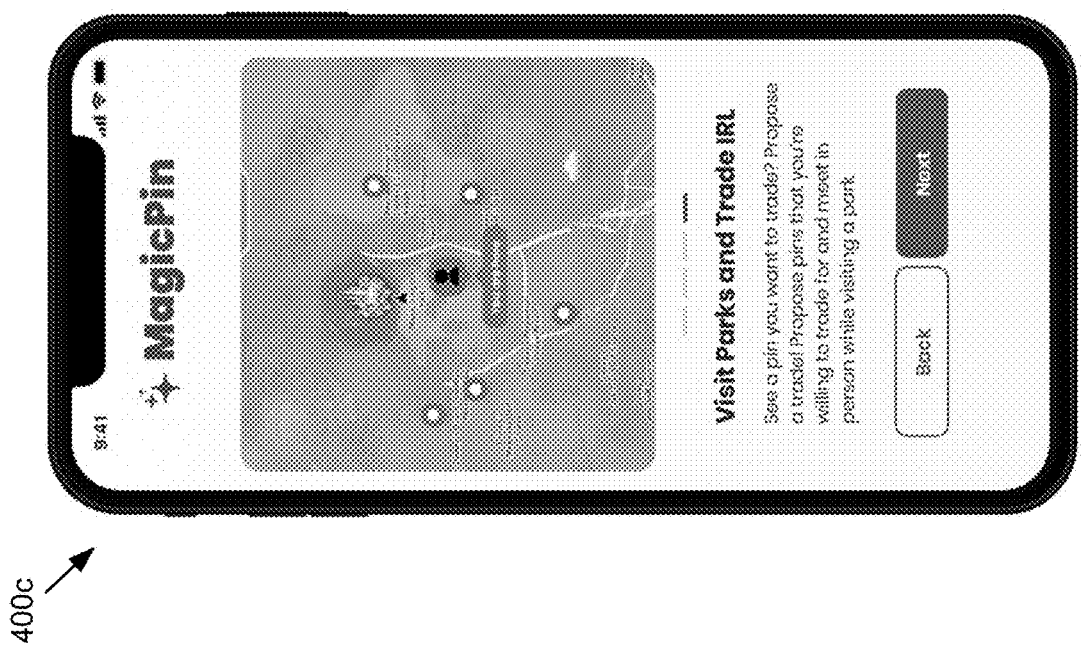

In some implementations, the geo-matching application 108 may onboard a user by allowing them to enter information for collectable pins or other items, sort the items into boards, find information on new items, and create a collector's profile, as illustrated in FIGS. 4A, 4B, and 4C. For instance, as illustrated in FIG. 4C, the geo-matching application 108 may detect when a client device 106 of a user is within a geofenced area in which trades are allowed. In some instances, the geo-matching application 108 (e.g., via the server 122) may indicate on a map of the area (e.g., a theme park or other venue) the location and identity of other items (e.g., enamel pins) available for viewing, trading, or purchase, for example, as determined by other instances of the geo-matching application 108. For example, FIGS. 4A, 4B, and 4C illustrate example graphical user interfaces 400a, 400b, and 400c showing example steps for growing a collection, finding collectable items, and finding geographic locations where items may be exchanged (e.g., where the geo-matching application 108 may flag items or allow them to be exchanged).

Figures 5A, 5B:
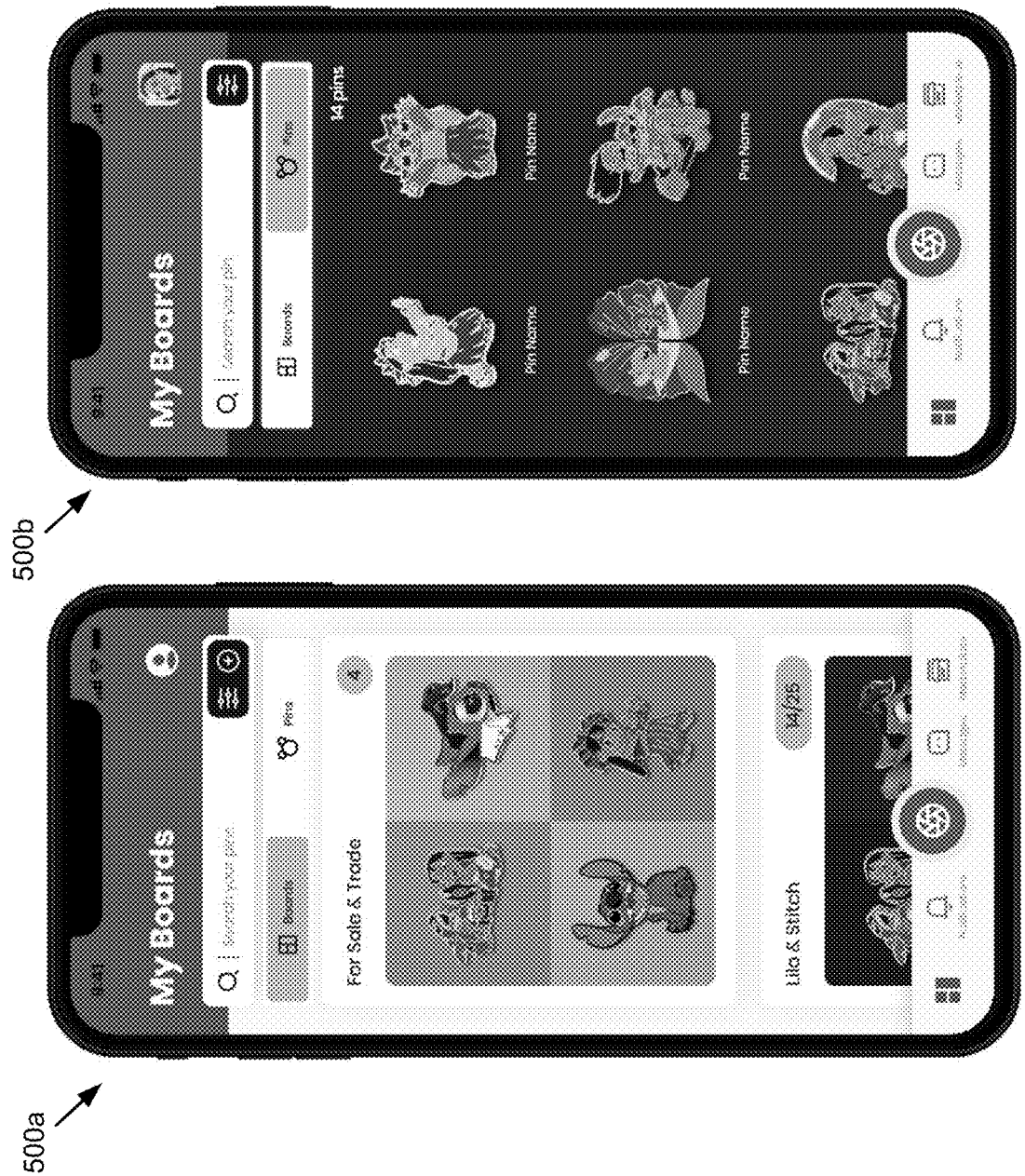
FIGS. 5A-5D illustrate example graphical user interfaces for displaying collections of items.

In some instances, the geo-matching application 108 may provide boards into which the collectable items in a collection may be sorted, for example, as illustrated in FIGS. 5A, 5B, 5C, and 5D (as well as other figures). For example, the geo-matching application 108 may automatically (e.g., based on determined item attributes) or manually (e.g., by a user) organize items. In some instances, one or more of the boards may be designated as for trade and/or sale, as illustrated in FIG. 5A.

Figure 5D:
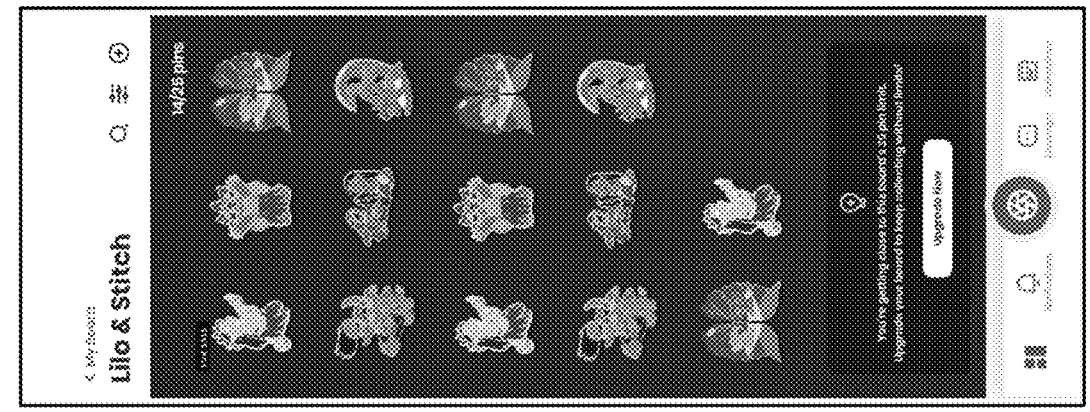
Figure 5C:
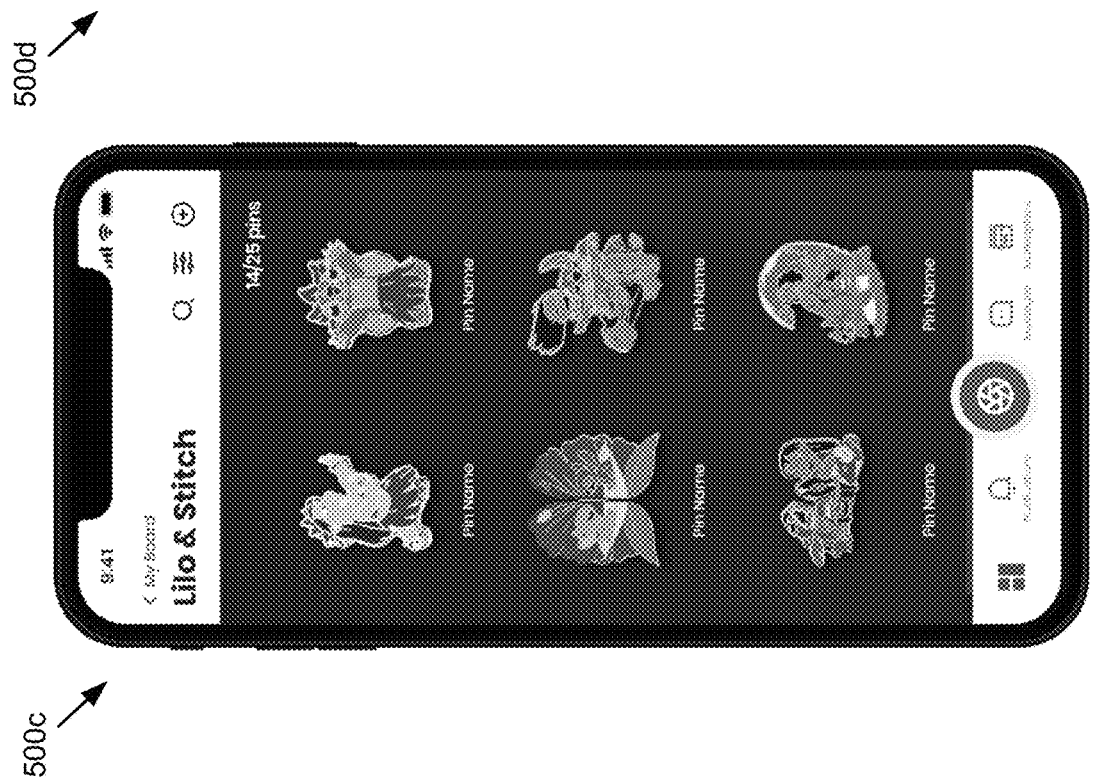

For example, FIG. 5A illustrates an example graphical user interface 500a including an example grid layout of collectable items, which may be divided into boards (e.g., for sale & trade or groupings). FIG. 5B illustrates an example graphical user interface 500b showing all items in a collection in a grid layout, although other layouts are possible and contemplated herein. For example, FIG. 5C illustrates an example grid view interface 500c of collectable items in which items may be manually or automatically displayed, ordered, enumerated, or named. FIG. 5D illustrates an example interface 500d in which the geo-matching application 108 may allow a user to expand their allotment of storage space in a database, thereby allowing the user to increase the items in their collection(s). Additionally, as illustrated in FIGS. 5A-5D, the example graphical user interfaces 500a-500d may display graphical elements for viewing a home screen, collections, boards, notifications, messages, marketplace(s), capturing images, or modifying a profile or account.

In some implementations, when a pin is moved to the for sale and/or trade board, the geo-matching application 108 automatically provides it for view and/or automatic matching as shown in FIG. 4C, other figures, and described herein. For example, the geo-matching application 108 may automatically display pins tagged as trade eligible on other instances of the geo-matching application 108. For example, if a certain pin is tagged for trade on a first instance of the geo-matching application 108, a second instance of the geo-matching application 108 (e.g., using the server 122 or direct communication between client devices 106) may display the existence, details, or location of the pin. In some instances, if a first user of a first instance of the geo-matching application 108 on a first client device 106 has indicated an interest in a certain pin (e.g., a request to purchase or trade for the item), the first instance of the geo-matching application 108 may automatically notify (e.g., based on receiving a push notification from the application server 122, which receives geo-location data from a second client device 106) on the first client device 106 that the requested pin (or at least the second client device 106 associated the requested item) is nearby (e.g., in the theme park).

Figure 5E:
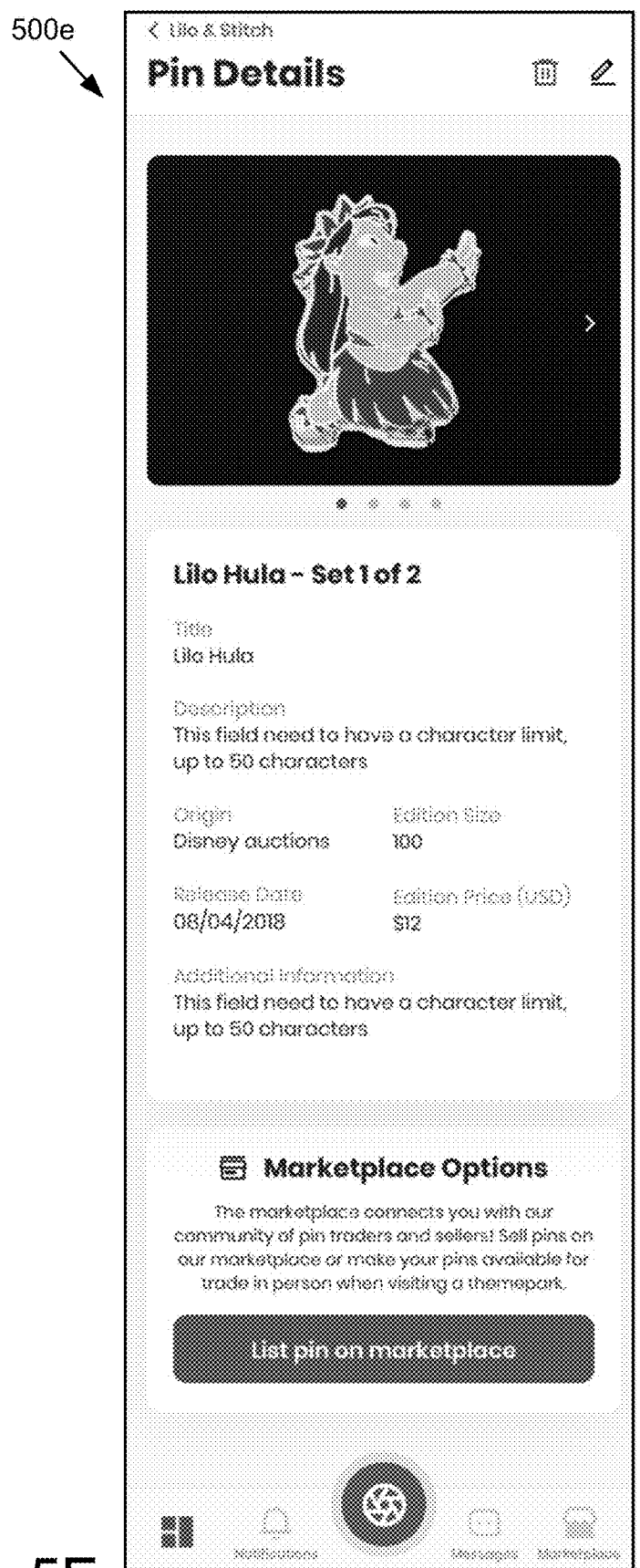
FIGS. 5E-5H illustrate example graphical user interfaces for moving or items within an interface, such as marking the items for sale or trade.
Figure 5F:
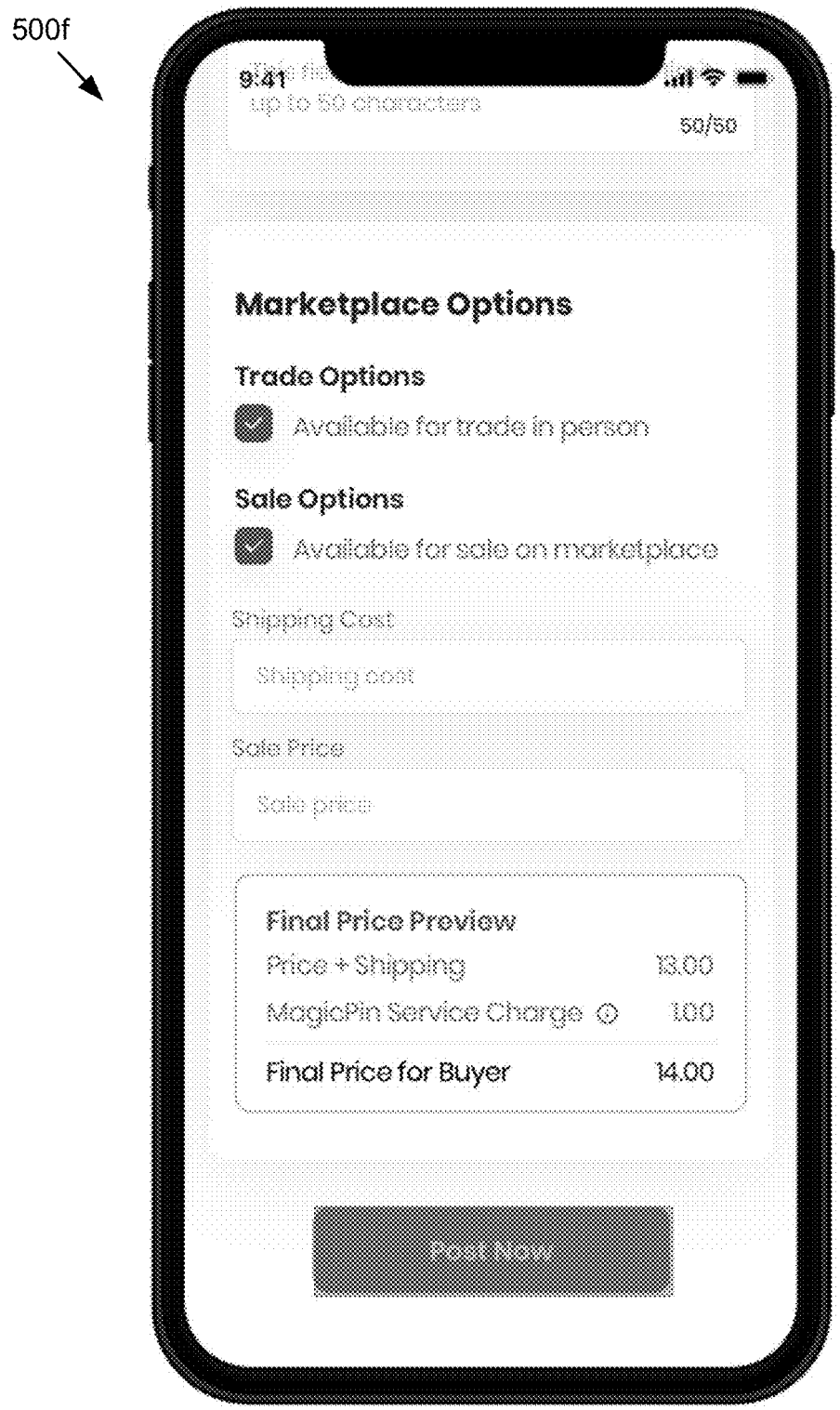
Figure 5G:
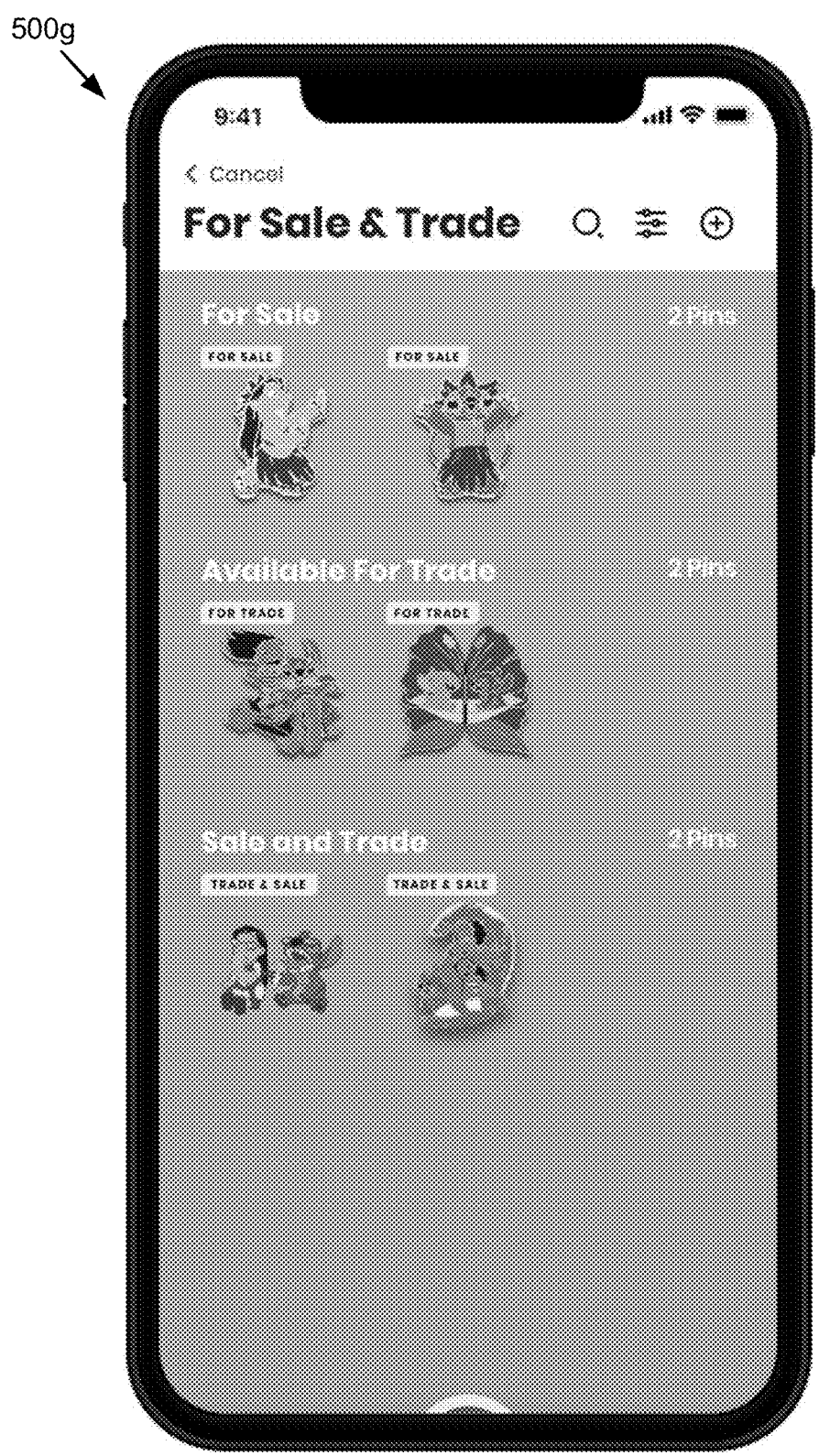

In some implementations, a user may tag a pin for trade, as shown in FIGS. 5E, 5F, and 5G, for example, and the geo-matching application 108 may automatically move or copy the records for those items into the sale/trade board based on the tag.

For example, FIG. 5E illustrates an item-details interface 500e provided by the geo-matching application 108, which may display, for instance, upon selecting a graphical element or image representing a certain item. Using the example interface 500e, a user may provide inputs to describe various attributes of an item, list a price or exchange request, select one or more images, delete an item, or confirm listing the item for trade or sale. FIG. 5F illustrates an example interface 500f may be displayed by the geo-matching application 108, for instance, upon selection to list an item in the interface 500e. The example interface 500f may allow a user to select whether to make an item available for trade in person, which may cause the geographical matching functionality of the geo-matching application 108 to activate, as described elsewhere herein. The user may also have the option to list the item for sale or trade outside or irrespective of this geographical boundary. In some instances, upon confirmation that the item should be listed for sale or trade, the geo-matching application 108 may display an example graphical interface 500g, which displays which items are for sale, for trade, for sale or trade, or otherwise.

Additionally, the geo-matching application 108 may generate a profile, trade history, marketplace, and other collection details for a user and/or item collection, for example, as described and shown in FIGS. 10A-10J, which are described in further detail below.

At 304, the geo-matching application 108 may determine a first attribute of a first item associated with the first item collection. For instance, an item may have a set of attributes, such as its color(s), shape, size, or other appearance features, title, serial number, description, release date, edition, edition size, or other additional information.

For instance, a user may enter a serial number for the pin and the geo-matching application 108 may automatically retrieve remaining attributes for the pin, for example, from a server 122 or 118. For example, FIG. 5E illustrates example detail interfaces showing details of a certain pin.

Figure 3B:
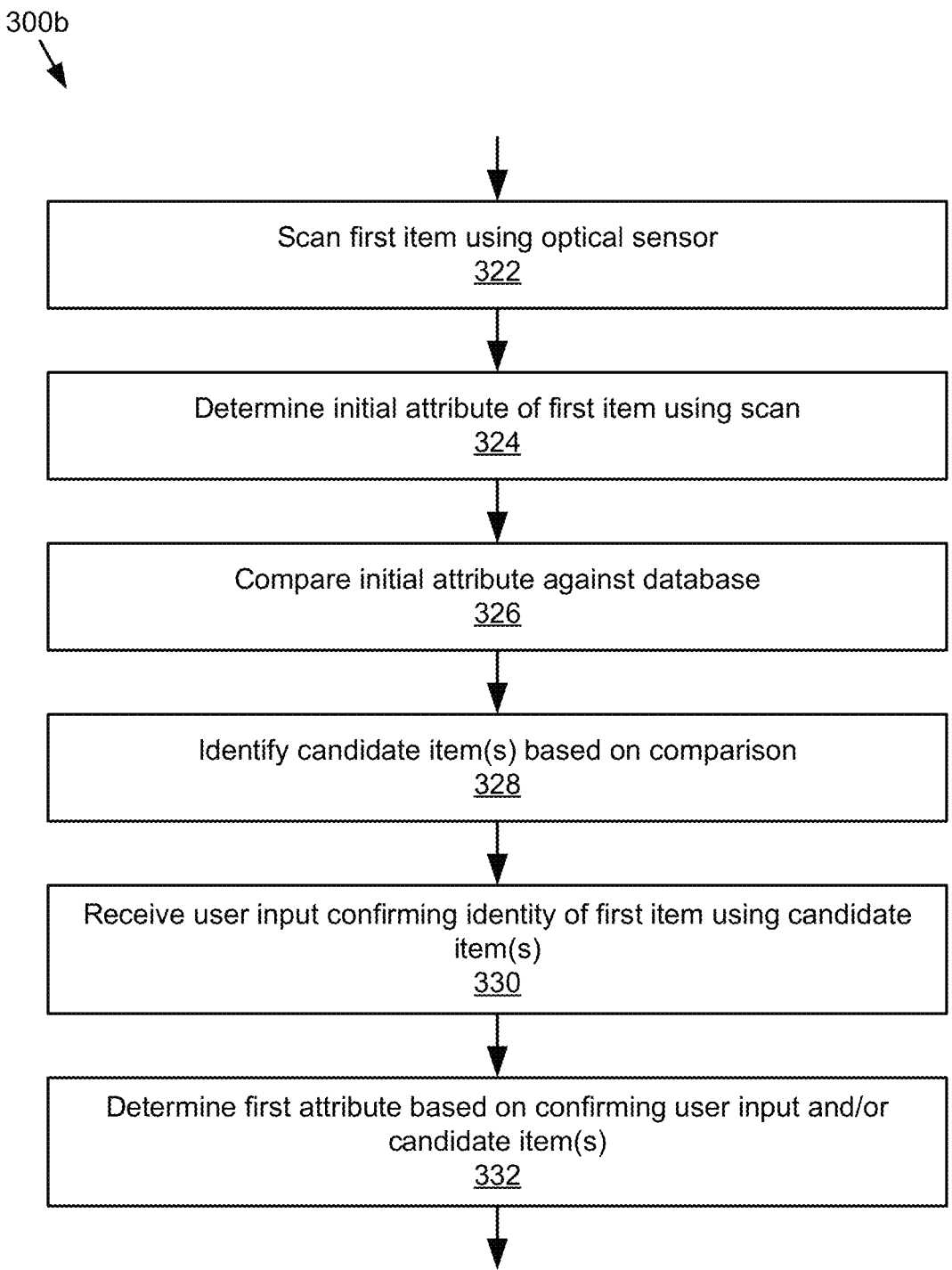
FIG. 3B is a flowchart of an example method for determining details of a tradeable item.
Figure 5H:
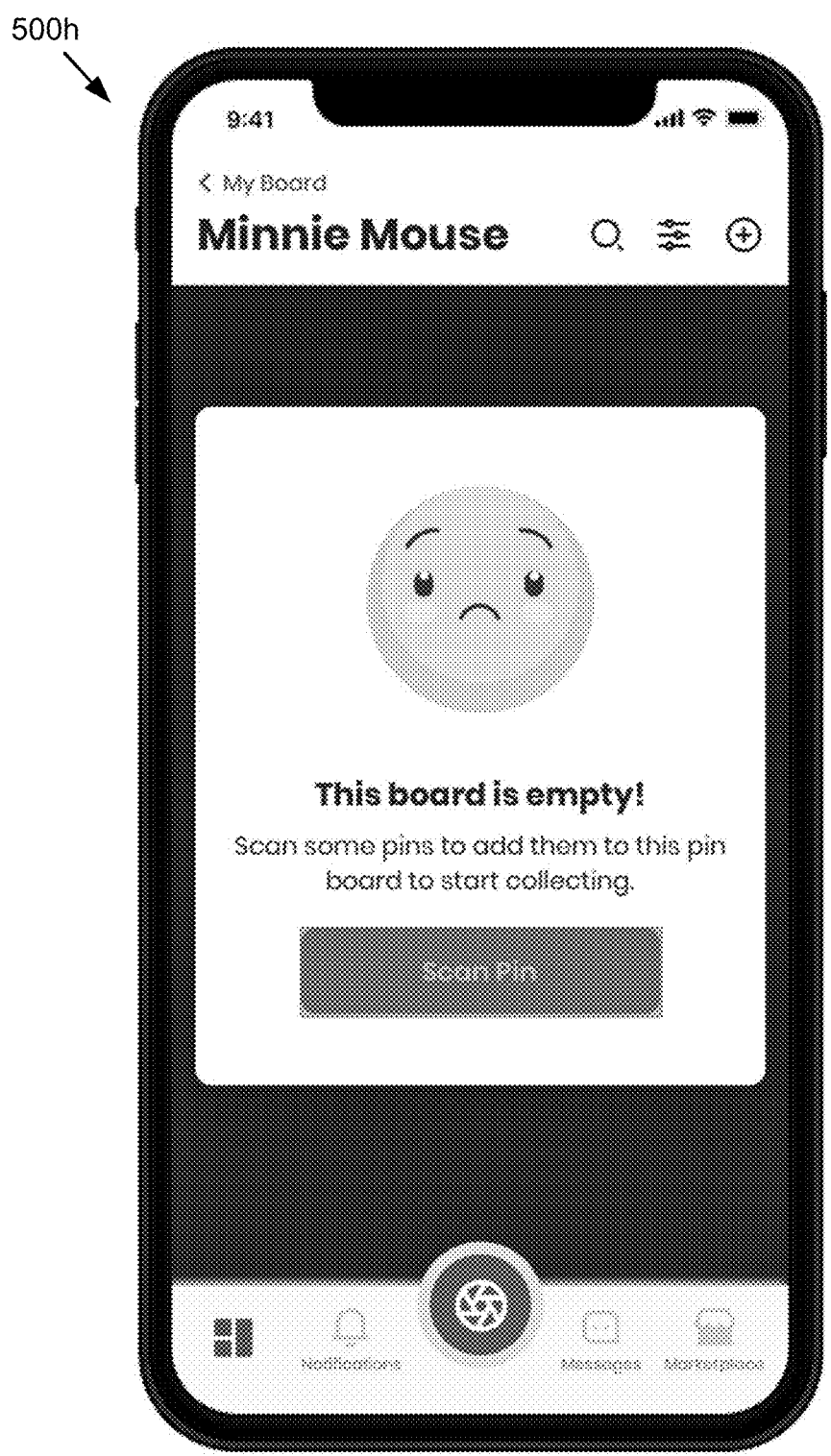

In some instances, an initial attribute may be received from a user via scan of the item, for example, as shown in FIGS. 5H and 7A-7F and described in reference to FIG. 3B. For example, FIG. 5H illustrates an example interface 500h that may indicate that a board of items is empty and/or allow a user to manually scan an item to add it to the board or collection.

At 306, the geo-matching application 108 may determine trade eligibility of the first item. For instance, the geo-matching application 108 may determine whether the item has been tagged by the user for trade. In some implementations, the geo-matching application 108 may determine trade eligibility for one or more pins, boards, collections, users, or client devices 106, based on the geographical location(s) of the client device(s) 106. For example, the geo-matching application 108 may allow a user to trade items once they are near a geographical location and/or within a geofence, such as where a second client device is located, within an amusement park, near a trading post location, or otherwise.

At 308, the geo-matching application 108 may identify a second user based on the first attribute of the first item, the trade eligibility of the first item, and/or an attribute of the second user. For instance, the geo-matching application 108 may automatically determine people or collections to trade with. For example, it may identify one or more second client devices 106, users, or collections, for example, in a defined area (e.g., a park, event, convention center, etc.) with whom one or more items may be exchanged. For instance, the geo-matching application 108 may determine that a second user has requested a certain attribute (e.g., a blue pin) or item, that a first user has indicated that a certain item (e.g., a blue pin) is available for trade, that the second user is located within a certain distance, has a certain credential, or other attributes of the second user.

In some implementations, a user may select, via a graphical user interface provided by the geo-matching application 108, one or more items that the user would accept in a trade and/or which the user wishes to acquire. In some instances, the geo-matching application 108 may automatically determine a pin that is lacking from the user's collection and may automatically determine that it is a requested pin. In some instances, the geo-matching application 108 may identify the second user, client device 106, or collection having the requested pin and/or requesting a pin offered for trade.

Figures 9A, 9B:
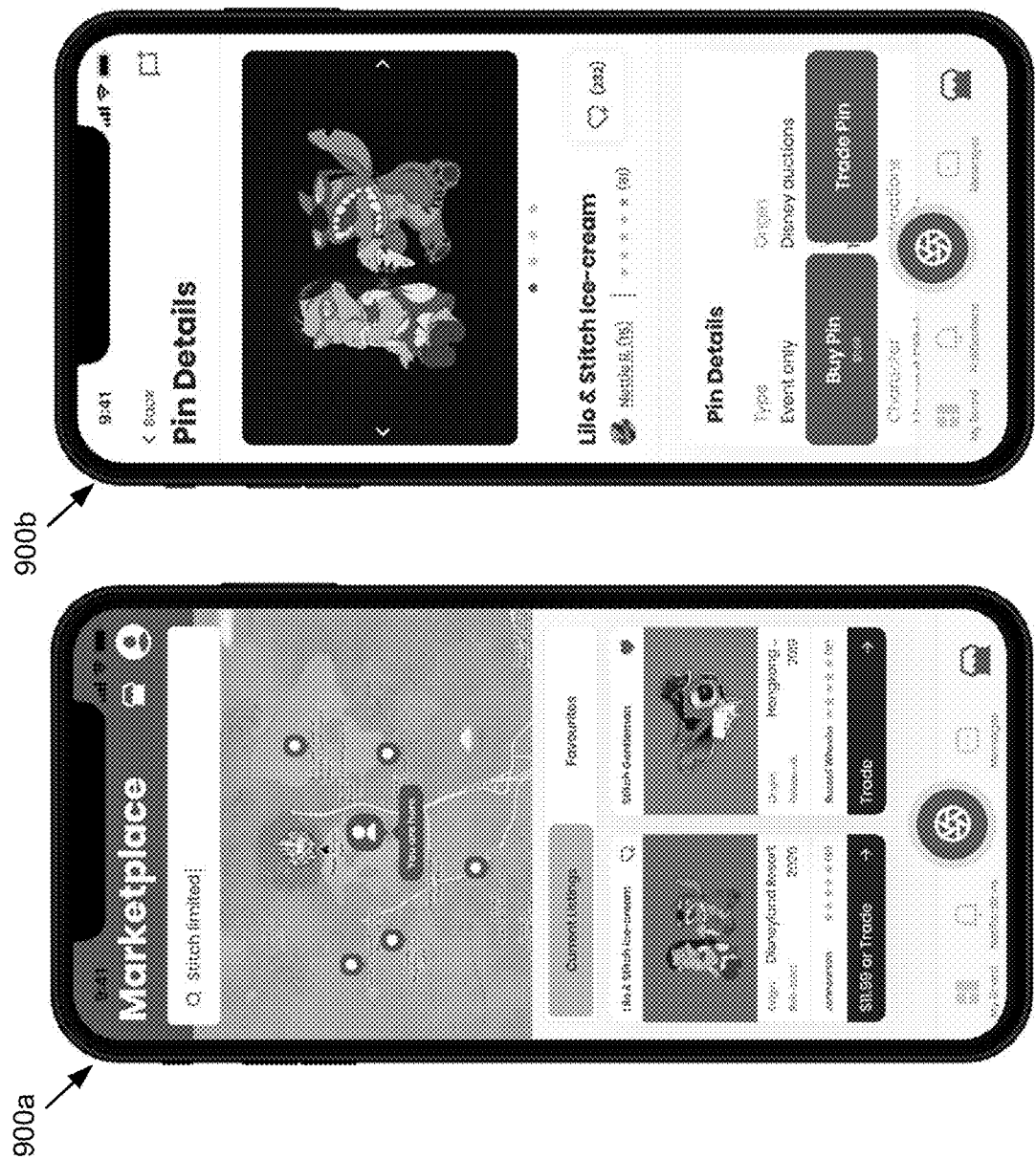
FIGS. 9A-9E illustrate example graphical user interfaces for providing location-enabled trading of items.

In some instances, the geo-matching application 108 may display a user's, a collection's, or a geographical location's available tradable items (either the total items or just those requested). For instance, FIG. 9A illustrates a graphical interface 900a showing a map of pin locations based on locations of associated client devices 106, such as those client devices 106 running the geo-matching application 108, with items offered for trade, with items requesting items for trade, or with matching items (e.g., the map may display locations where users are with requested items in their collections or offered for trade). In some instances, the interface 800a may receive queries for certain items and may automatically display locations where matching items are located based on geographical information from the geo-matching application 108 (e.g., based on GPS or other location sensor(s) of respective client devices 106).

As shown in FIG. 9B, the geo-matching application 108 may display a graphical user interface 900b via which a user may search for and/or select a certain available pin to see its details and/or that of the user profile offering the pin. For instance, a user may select an item (e.g., from the map in the interface 900a or from a display of another user's collection) and, based on the selection, the interface 900b may be displayed. The interface 900b may receive user input requesting to purchase the item, trade for an item, or otherwise. Similarly, the interface 900b may automatically display user or item ratings, item details, item image(s), or other information.

Figure 9D:
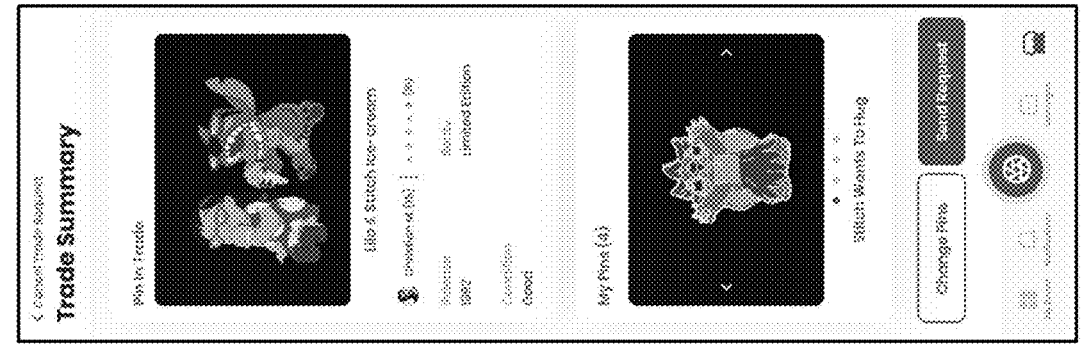
Figure 9C:
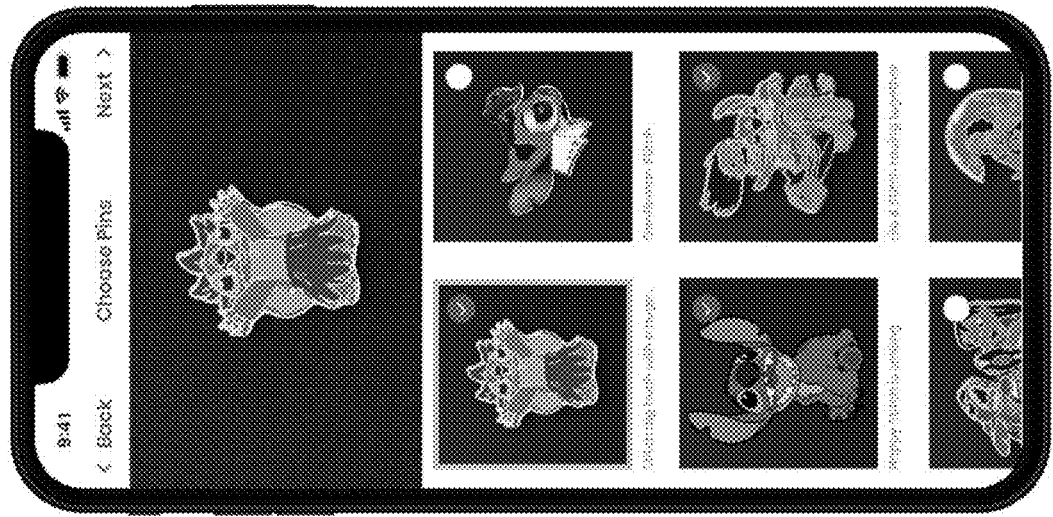

FIG. 9C illustrates an example graphical user interface 900c via which one or more pins may be selected, for example, to receive or give in a trade. For instance, the interface 900c may be display in response to a user indicating (e.g., in the interface 900b) that the user wants to trade an item. Accordingly, the interface 900c may allow selection of one or more items for a trade (e.g., with the item displayed in the example of 900b).

Responsive to the selection of one or more items, the geo-matching application 108 may display a confirmation. For example, FIG. 9D illustrates an example graphical user interface 900d showing a trade summary indicating one or more pins offered for trade and/or which would be received in the trade, if accepted by both users. For instance, the interface 900d may show one or more items being traded and/or received as well as other information, such as user information, location information, item attributes, or other information of pertaining to the trade.

Figure 9E:
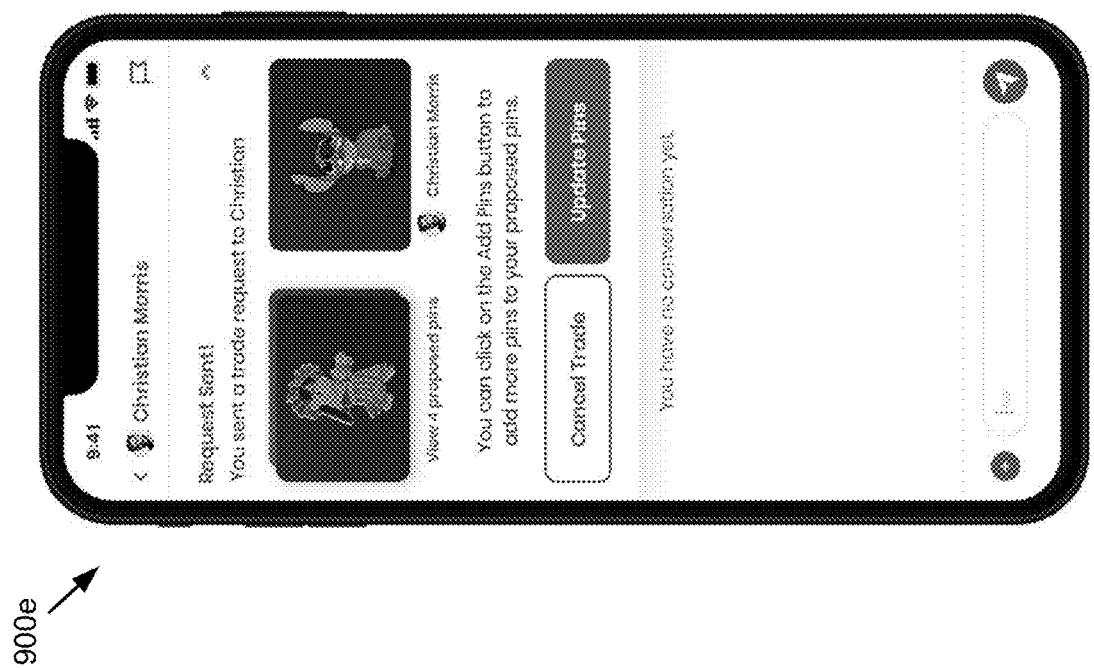

FIG. 9E illustrates an example graphical user interface 900e showing a trade-request confirmation page showing the item(s)/pin(s) being offered and the pin(s) received. If the second user accepts the offer via the second user's instance of the geo-matching application 108, the method may proceed to the operation at 310, for example. For instance, the geo-matching application 108 may automatically provide communication, location information, or transaction interfaces enabling the users to communicate, trade, meet, or otherwise, as described herein. In some implementations, the interface 900e may include graphical elements allowing the user to update their collection or instruct the geo-matching application 108 automatically update the collection(s) of the user(s).

At 310, the geo-matching application 108 may enable a trade of the first item including providing communication between the first and second client device 106. For example, the geo-matching application(s) 108 may provide messaging, payment, and/or location services.

Figures 6A, 6B:
FIGS. 6A and 6B illustrate example graphical user interfaces for providing notifications to users about collectable items.

In some implementations, the geo-matching application 108 may send notifications and/or send/receive messages for negotiating a trade, arranging a meeting location, etc. For instance, FIG. 6A illustrates notifications from a "buyer's" instance of the geo-matching application 108 and FIG. 6B illustrates notifications from a "seller's" instance of the geo-matching application 108, although these roles can be reversed depending on the trade. For example, FIG. 6A illustrates an example graphical user interface 600a, which displays notifications sent/received via the geo-matching application 108, for example, relative to collectable items. The notifications may pertain to specific items, messages, users, or time periods. For instance, the notifications may display automatically generated subject lines relating to collectable items, such as trade requested, you made a sale, or messaging request received. FIG. 6B illustrates another graphical user interface 600b showing the notifications, but the notifications may be automatically modified for items that are being sold instead of purchased, for instance.

Figures 8A, 8B:
FIGS. 8A-8H illustrate example graphical user interfaces for providing interaction between users in a trading tool.

Messaging can be provided within the geo-matching application 108 (and communicated via the application server 122, directly between client devices 106, or via a third-party server 118) or via SMS, MMS, or another messaging service. For example, FIG. 8A illustrates an example graphical user interface 800a, which may be used for communication between users of the geo-matching application 108 and enabling trades. For instance, the interface 800a may display conversations for various users and/or items, may display whether a message has been read or viewed, or whether there are new messages. In some instances, the interface 800a may allow messages/conversations to searched via keywords, such as item names, item attributes, etc.

FIG. 8B illustrates an example graphical user interface 800b including a message confirming a trade request between users. For instance, the geo-matching application 108 may allow selection of an item (e.g., from a board) and/or automatically recommend a trade, as described herein. For instance, if a first user has an item in a collection, a second user may offer certain items for trade via the interface 800b (e.g., displayed on the interface 800b) and the first user may decline the trade, accept the trade, or choose an item to trade.

Figures 8C, 8D:

FIG. 8C illustrates an example graphical user interface 800c allowing a user to be report another user, for example, for inappropriate communications and/or poorly rated trades which may reduce functionality and/or be reflected in the user's rating. The interface 800c may display graphical elements that may be selected to identify a reason for reporting the user.

FIG. 8D illustrates an example graphical user interface 800d including a message for declining or suggesting a different trade via the geo-matching application 108. For example, 800d may overlay a message responsive to a selection to decline a trade (e.g., from interface 800b) allowing the user to confirm declining the trade or change their mind.

Figures 8E, 8F:
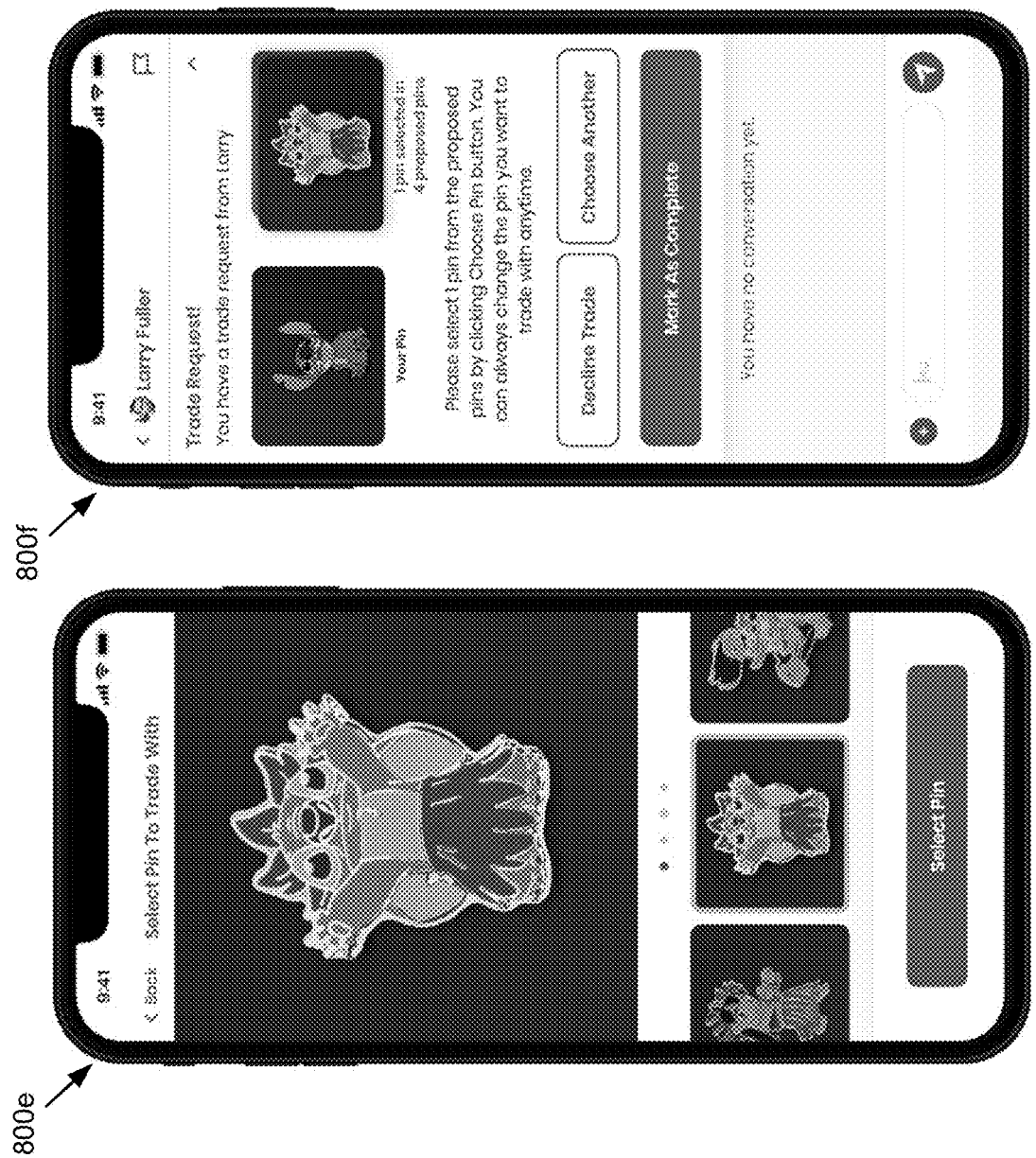

FIG. 8E illustrates an example graphical user interface 800e displaying a pin selection that may be transmitted in a message. For instance, responsive to a trade request or when generating a trade request, the geo-matching application 108 may display an item selection area displaying multiple images of items and an item preview region that may display the item and/or allow its selection.

Figures 8G, 8H:
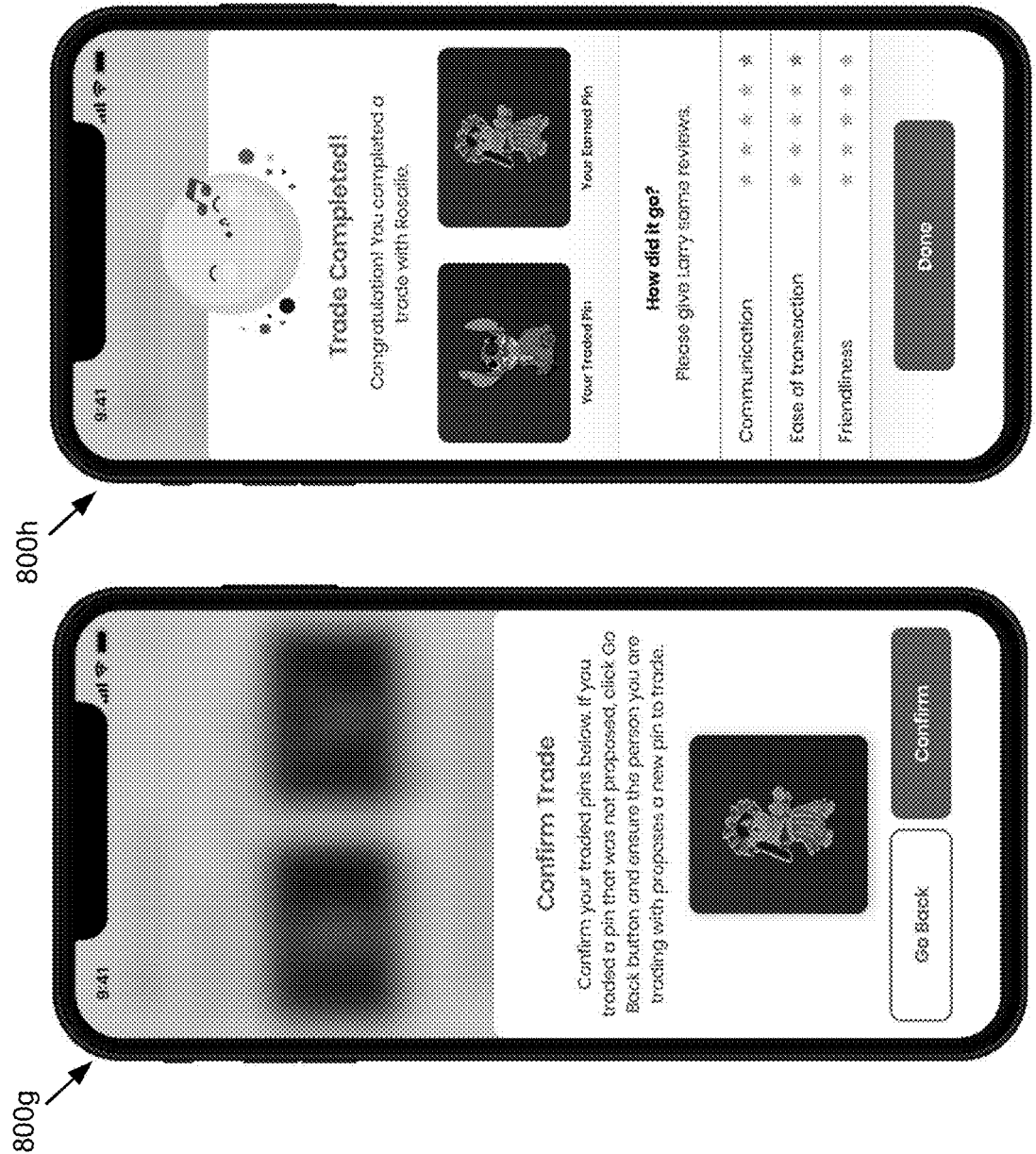

FIG. 8F illustrates an example graphical interface 800f for providing a counteroffer message for a trade. For instance, the geo-matching application 108 may automatically display the interface 800f responsive to a user receiving a trade request, declining a trade request, accepting a trade request, or otherwise. The interface 800f may include selection elements allowing a user to decline a trade (e.g., for a certain item in the user's collection), accept or complete a trade, or chose another item for trade (e.g., as a counteroffer). For example, the geo-matching application 108 may provide communication, maps, or other interfaces (e.g., as described elsewhere herein) allowing users to meet and exchange items. The interface 800f may receive a user input confirming a trade. Based on the input (e.g., by a single user on a first instance of the geo-matching application 108 or by both users on their respective instances), the geo-matching application 108 may automatically update each users' collections or otherwise mark the trade as complete. Additionally or alternatively, FIG. 8G illustrates an example graphical user interface 800g with graphical elements for confirming a trade. For instance, the interface 800g may be an overlay message allowing one or more users to cancel, change their mind, or confirm a trade.

FIG. 8H illustrates an example graphical user interface 800h for rating a trade and/or user. For instance, the geo-matching application 108 may display the interface 800h responsive to a confirmation of a trade (e.g., in interfaces 800f or 800g). The geo-matching application 108 may display the traded items and receive user inputs rating the user, item, and/or trade. In some implementations, the geo-matching application 108 may accumulate rating information and/or report information (e.g., from interface 800c) and use it to automatically provide user ratings, filter trade recommendations, or provide access to other functionality of the geo-matching application 108 (e.g., a defined user rating or report may disallow a user from seeing locations or participating in-person trades).

In some implementations, enabling communication between the first and second client device 106 may include providing a location of one or both of the client devices 106. For instance, if both client devices 106 are within a geofenced area or distance from a geographical point, the geo-matching application 108 may exchange the locations of the client devices 106.

In some implementations, the precision of the provided location may change based on certain conditions, such as if the users have an agreed trade, if they are nearer each other, if they are within a city, within a geofenced area, etc. For example, if no agreement has been reached between the users, only a broad location may be provided (e.g., an area or "land" within a theme park). Once the users have agreed to trade items or are sufficiently proximate to one another, a precise location may be provided. Other information, such as a user profile picture, may also be provided.

In some implementations, the geo-matching application 108 may automatically determine (e.g., on a backend, such as by the application server 122) the locations of both the first and second client devices 106. The geo-matching application 108 may automatically determine, based on the locations of the client devices 106 and/or other criteria (e.g., designated meeting places within a geofenced area, such as a meeting place in a theme park) and suggest a common meeting place for the users. For instance, if both client devices 106 are at a south side of a park, the geo-matching application 108 may provide a meeting place near a center location in the south side of the park.

In some implementations, if money is being exchanged in addition to or in place of collectable items, the geo-matching application 108 may provide (e.g., at the application server 122 or third-party server 118) back-end payment processing, for example, using a credit card, PayPal™, Venmo™, etc. In some instances, the geo-matching application 108 and/or a server 118 or 122 may provide interfaces, instructions, and/or back-end processing to allow an item to be shipped. For instance, as illustrated in FIGS. 9A-9E, the geo-matching application 108 may provide interfaces to enable purchasing and/or shipping items.

In some implementations, the geo-matching application 108 may automatically update a collection, board, trade history, or profile associated with a user once a trade has been completed or confirmed. For example, the geo-matching application 108 may automatically move a certain item associated with a first collection in a database to be associated with a second collection in the database. Accordingly, when a user views their own collection (or that of another user), the geo-matching application 108 may automatically display an updated view of the items in the collection based on the associated items in a database.

Figures 10A, 10B:
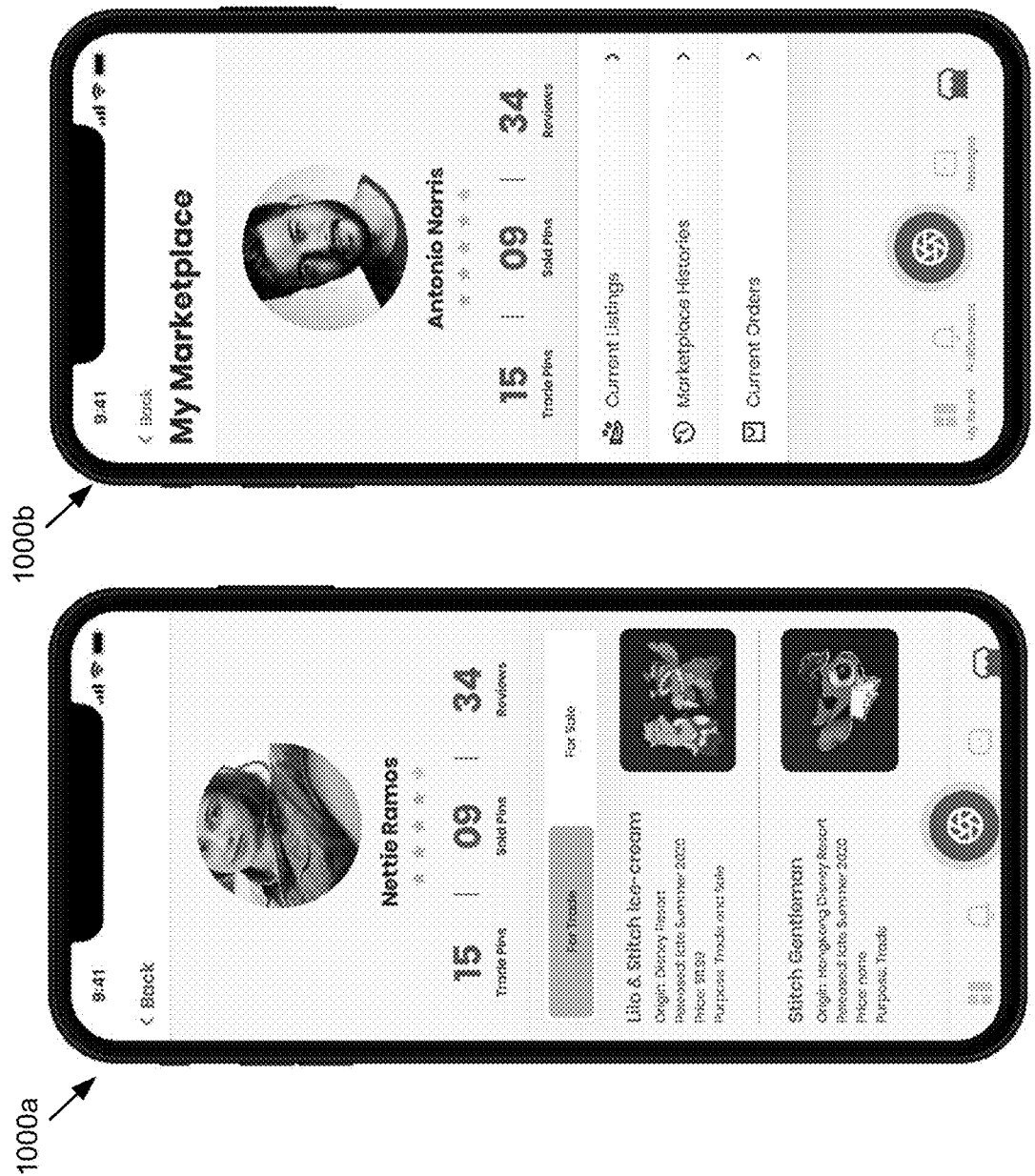

FIG. 10A illustrates an example graphical interface 1000a showing a user profile along with that user's trade history, rating, items offered for trade or sale, and other details, for example, of a second user that may have items available for trade. For instance, the geo-matching application 108 to view (e.g., responsive to selecting a user's location on a displayed map, to being automatically matched, etc., as noted herein) user profile or other information. For instance, the interface 1000a may display user profile information, user rating, user statistics, and/or items for trade or sale by the user.

FIG. 10B illustrates an example graphical user interface 1000b showing a user's own profile along with their current listing, histories, requested items, and other details. For instance, the geo-matching application 108 may allow a user to see their own ratings or statistics, their current listings (e.g., items offered for trade or sale), their history, their current orders and/or requests (e.g., for items they would like to trade for), or other information.

Figures 10C, 10D:
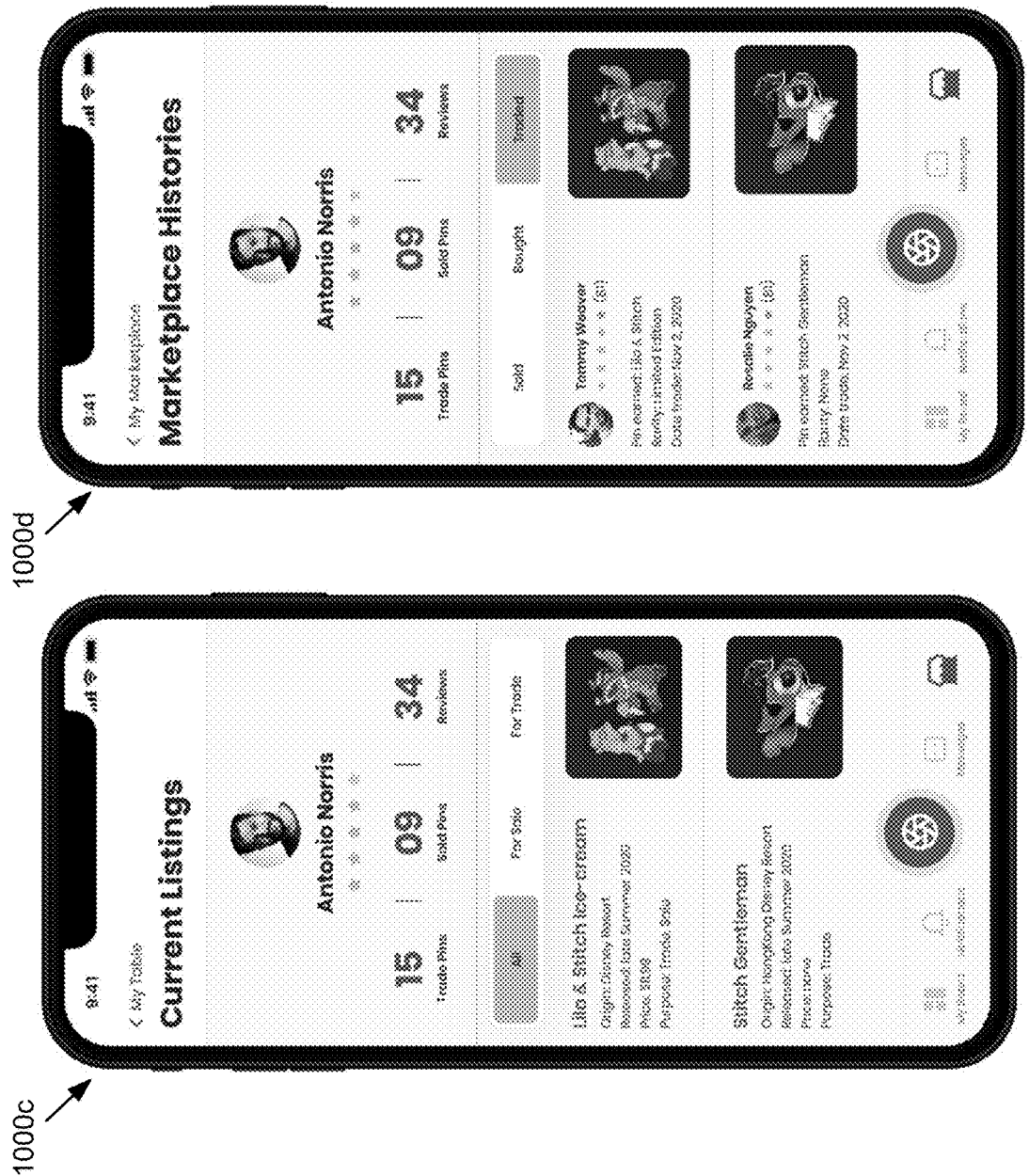

FIG. 10C illustrates an example graphical user interface 1000c showing details of a user's current items. For instance, upon receiving a selection of an element in the interface 1000b to display a user's current listings, the geo-matching application 108 may display the interface 1000c, which may display the user's collection, their items marked for sale, and/or their items marked for trade.

FIG. 10D illustrates an example graphical interface 1000d showing items that have been traded or other histories of the user. For instance, the geo-matching application 108 may display the interface 1000d responsive to a user input requesting (e.g., in the interface 1000c) to view the user's trade or purchase histories.

Figures 10E, 10F:
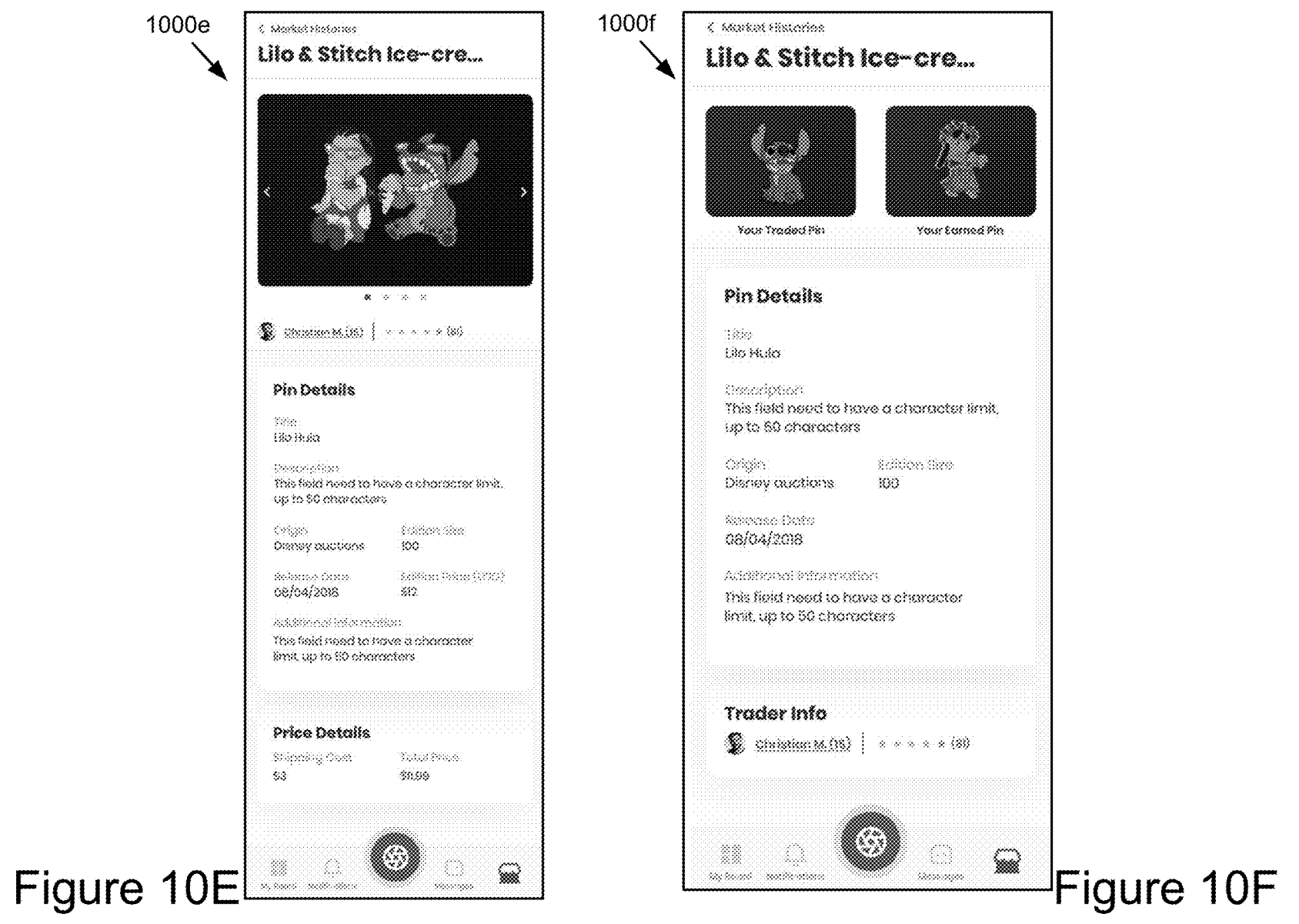

FIGS. 10E and 10F illustrate example interfaces 1000e and 1000f showing traded or tradeable items details, for example, the interfaces 1000e and 1000f may provide item attributes, trade details, trader information, etc. For instance, the interface 1000e may be displayed upon selection of an item in a market history or other graphical interface, as described above, thereby allowing the user to view attributes of items they have sold, traded, traded for, purchased, offered for trade/sale, or otherwise. Additionally or alternatively, for instance, if an item in the history has already been traded, the geo-matching application 108 may display the example interface 1000f, which shows the item(s) traded and/or received in a trade.

Figures 10G, 10H:
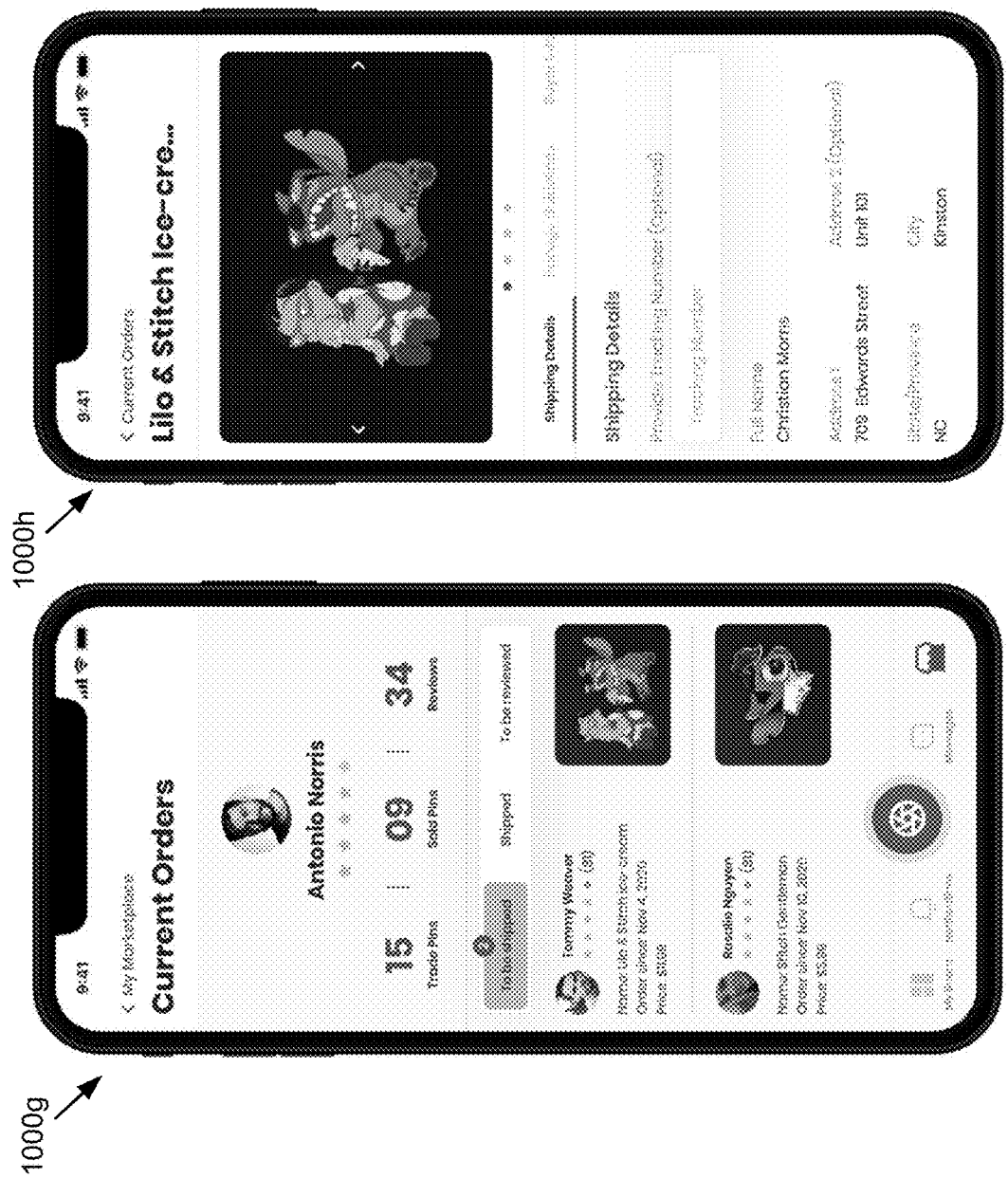

FIGS. 10G and 10H illustrate example graphical user interfaces 1000g and 1000h providing shipping instructions for items, marking an item as shipped, providing a tracking number, providing a shipping address, providing packaging guidelines, etc. For instance, the geo-matching application 108 may display items to be shipped, shipped, to be reviewed or otherwise corresponding to their pending orders. In some instances, responsive to selecting a current order (e.g., from the interface 1000g), the graphical user interface 1000h may display shipping details, such as a tracking number, the address of a user with whom at transaction or trade is being made, or other details.

Figures 10I, 10J:
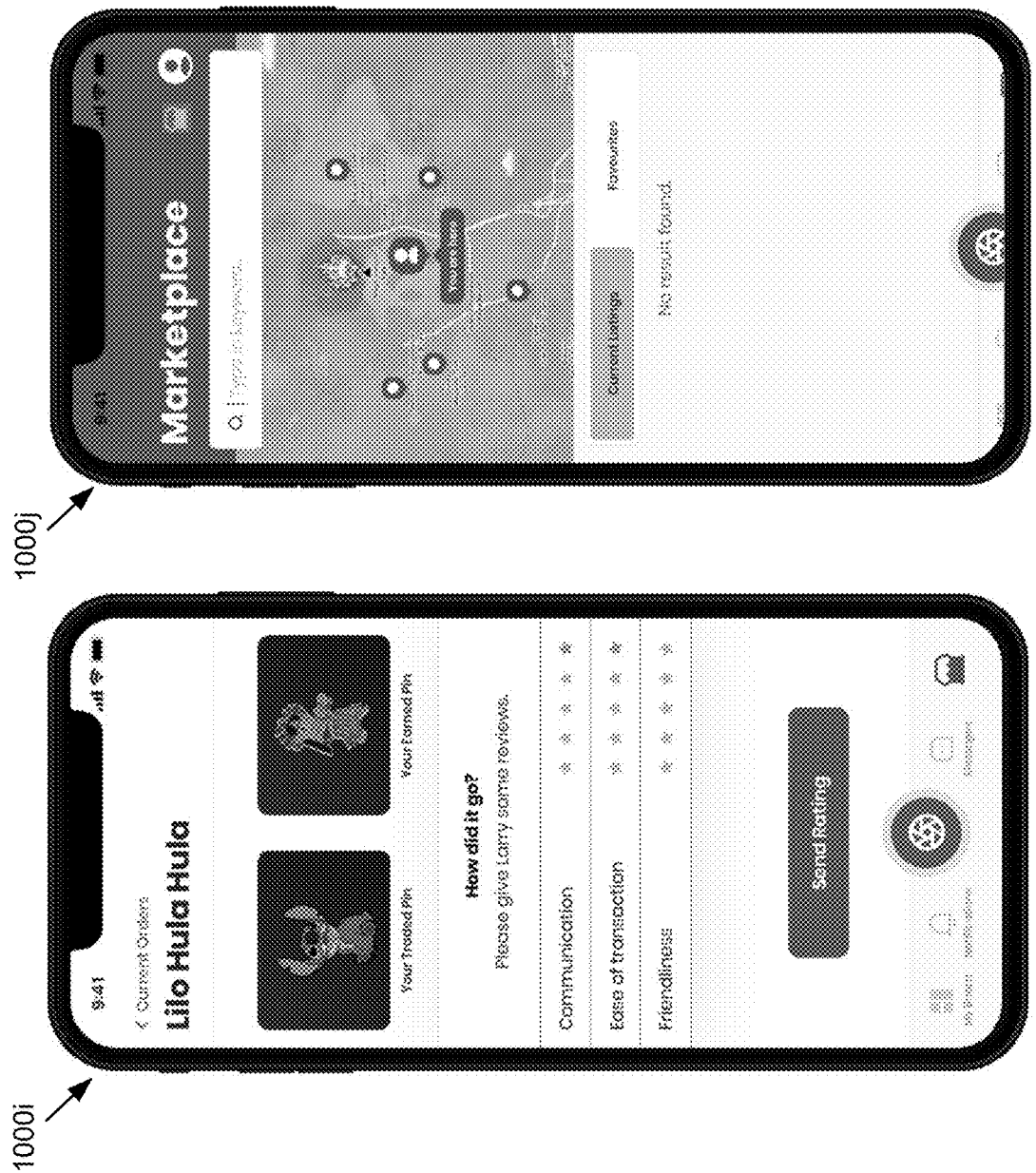

FIG. 10I illustrates an example graphical user interface 1000i for sending a rating for the transaction or user (e.g., as in FIG. 8H), which may reflect on the trade and/or user profile once a trade is complete.

FIG. 10J illustrates an example graphical user interface 1000j including a searchable field for finding current tradeable items in a geographical area, favoriting items, collections, or users, and/or providing other interactions or information. For instance, the geo-matching application 108 may receive a user input searching for an item, item attribute, or user, and it may display users (e.g., client devices 106 of the users) with collections having those items or offering those items for sale or trade. The interface 1000j may display other information, such as the user's current listings or favorites, their current location, or other data.

FIG. 3B is a flowchart of an example method 300b for determining details of a tradeable item. For example, FIG. 3B shows operations for scanning a physical item, identifying the items, and determining its attributes. Additional details and operations for scanning, processing, and matching items/images are described in reference to FIG. 3D and throughout this disclosure.

At 322, the geo-matching application 108 may scan a first item using an optical scanner. For instance, the geo-matching application 108 may access a digital camera of the client device 106 and capture an image or video of a physical item. For instance, as illustrated in FIGS. 5H, 7A, and 7B, the geo-matching application 108 may scan an item and, potentially, perform image processing and analysis. For instance, the geo-matching application 108 (and/or a backend process on an application or third party server 122 or 118) may perform image processing, such as, by removing a background of the item in the image, isolating the item in the image, correcting colors, rotating the item, removing noise, cropping, resizing the image to match a defined aspect ratio or resolution, conversion to grayscale, heatmap, or another image (e.g., for processing/search purposes), and/or other operations. For example, FIG. 7A illustrates an example graphical interface 700a, which includes an image region displaying a viewfinder image, which may be captured. FIG. 7B illustrates example graphical interface 700b where the item has been captured and, for instance, the geo-matching application 108 has processed the image to remove the background of the item (e.g., by selecting a border, etc., as described herein).

In some implementations, the geo-matching application 108 may use machine learning to preprocess an imported image and/or may, using defined operations and/or machine learning, extract features from the image. The geo-matching application 108 may determine a feature vector, which may include determining a shape, resizing the shape, flattening the image, normalizing colors or other features, and/or performing other feature extraction operations on the image.

At 324, the geo-matching application 108 may determine an initial attribute of the first item using the scan. For instance, the geo-matching application 108 may determine a shape, color(s), or other attributes from the image. For example, details of the item may be identified using various methods that provide an input feature vector that can be used by the geo-matching application 108 and/or the application server 122 to identify the scanned item.

At 326, the geo-matching application 108 may compare the initial attribute of the first item against a database of item attributes. For instance, the geo-matching application 108 may compare the attribute against a database of items based on the initial attribute and the indexed attributes to determine one or a plurality of candidate items that could match the item in the captured image.

In some instances, the geo-matching application 108 or another component of the system 100 may generate a catalog of items, for example, by crawling websites, forums, etc., and/or by using previously scanned images and associated entered item attributes.

In some implementations, the geo-matching application 108 may use image processing, keywords searching, and/or natural language processing to build the database. In some instances, these operations may be augmented using various machine learning models. In some implementations, the geo-matching application 108 may index the database so that various image or other item attributes may be used to quickly match item identities.

Figures 7C, 7D:
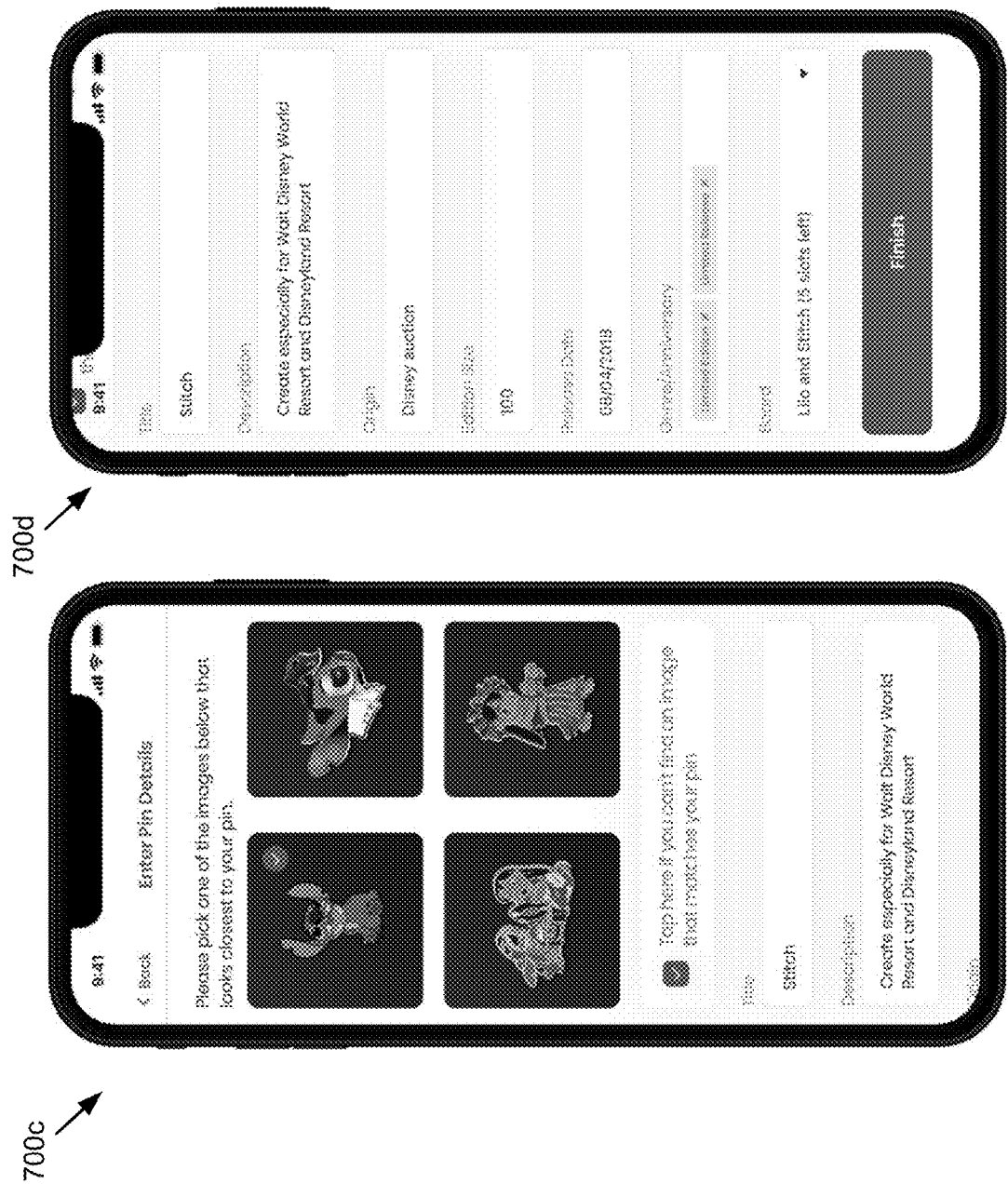

At 328, the geo-matching application 108 may identify candidate item(s) based on the comparison of the initial attribute with those in the database. For example, the geo-matching application 108 may determine one or a set of candidate items having matching attributes. In some instances, candidate items may be determined based on a threshold level of probability that there is a match with the item in the captured image. For example, as illustrated in FIG. 7C, the geo-matching application 108 may present a graphical user interface 700c including elements displaying multiple candidate items matching a scan and/or other received item attributes. For instance, a feature vector of whichever item attributes are received from the user and/or the image may be searched in the database.

In some implementations, if no item is found in the database (e.g., with a threshold level of certainty), the geo-matching application 108 may allow the user to manually identify the item and/or provide its attributes.

In some instances, if a determined image of an identified item is of better quality (e.g., in clarity, resolution, noise, etc.) than the received image, the geo-matching application 108 may automatically use the determined image to display for trades, etc., as described elsewhere herein.

Figures 7E, 7F:
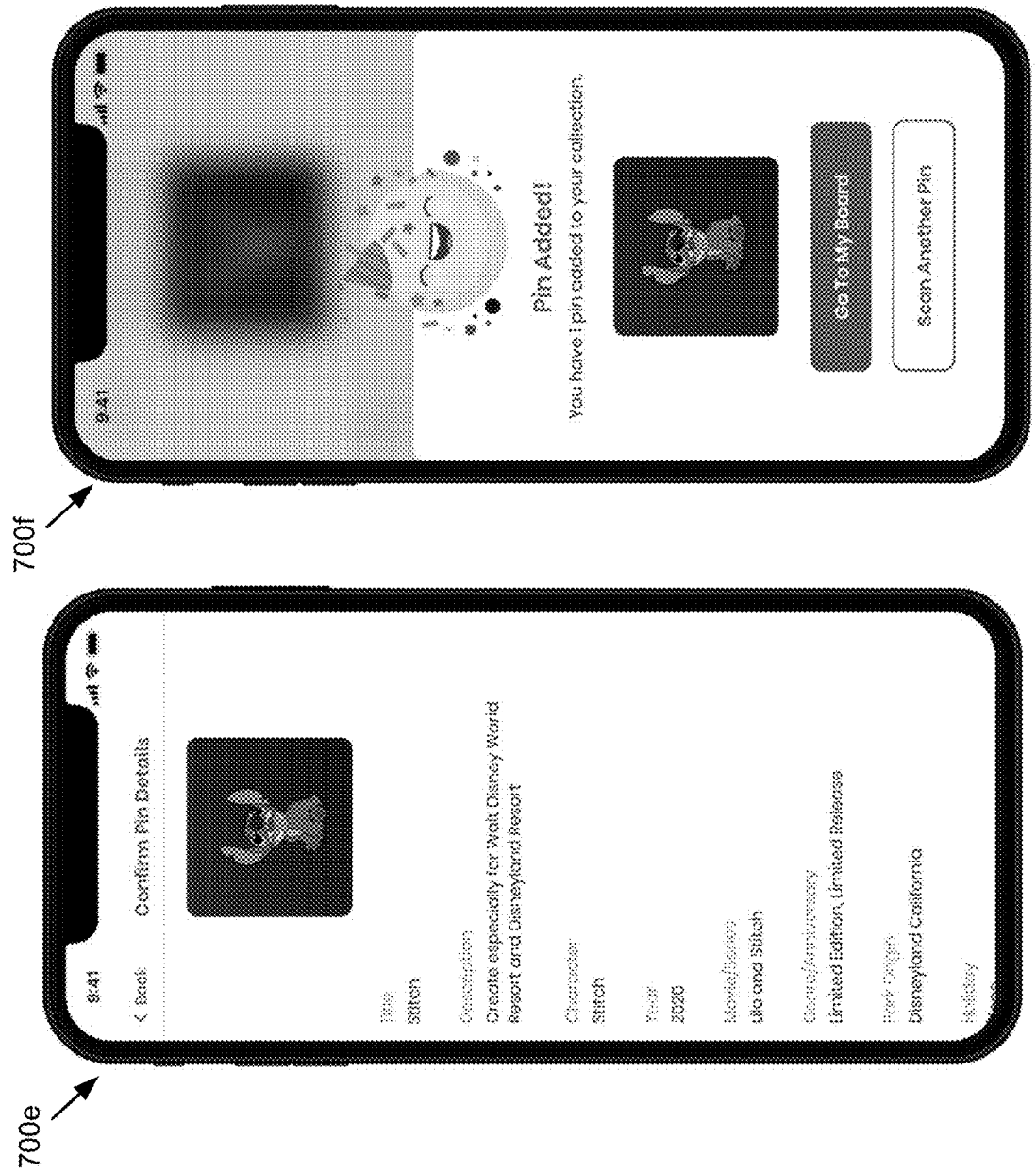

At 330, the geo-matching application 108 may receive a user input confirming the identity of the first item using the identified candidate item(s). In some instances, additionally or alternatively, the user input may confirm or modify other attributes of the item. For example, as illustrated in FIG. 7C, the user may select from a set of candidate items matching the scanned image. As illustrated in FIG. 7D, the user may edit or confirm attributes of the item, candidate item, or confirmed item. For example, FIG. 7D illustrates an example graphical user interface 700d including various text entry fields, drop down menus, and other elements for receiving user inputs and defining item attributes. In some implementations, based on the scan or automatically determined information (e.g., as described elsewhere herein), the geo-matching application 108 may autofill the fields. Similarly, the geo-matching application 108 may provide the example interfaces in FIGS. 7E and 7F for confirming item details and adding the item to a board/the collection. For example, FIG. 7E illustrates an example graphical user interface 700e in which the geo-matching application 108 may display and/or allow a user to confirm automatically determined and/or manually entered item details. FIG. 7F illustrates an example graphical user interface 700f in which the geo-matching application 108 may display (e.g., in response to confirmation in 700e) a confirmation message that an item has been added to a board and/or collection. In some instances, the interface 700f may allow a user to go to a board, scan an item, display item details, or perform other operations.

At 332, the geo-matching application 108 may determine the first attribute based on the confirming user input and/or the candidate item(s). For instance, an attribute or set of attributes of the item may be updated based on the confirmation or manual editing by the user. In some instances, if a probability of accuracy is sufficient, the geo-matching application 108 may forgo requesting confirmation and may automatically identify the pin and/or add it to a board or collection.

As an illustrative example of these operations, a collector may wish to add a new enamel pin to his or her digital collection. The collector may indicate to capture an image of the pin on a graphical user interface provided by the geo-matching application 108 on the collector's client device 106. The collector may place the pin on a table and capture the image with the client device 106's camera. The geo-matching application 108 may process the image to determine a query vector that describes one or more attributes or features of the pin in the captured image (e.g., as described in reference to FIGS. 3B and 3D).

After generating a query vector, the geo-matching application 108 may match the query vector against a database describing items to determine which of the database items most closely match the query vector (e.g., the features of the pin in the captured image). In some instances, it may retrieve multiple potential matching items and their associated attributes and present them to the collector for confirmation. For instance, the collector may indicate that the enamel pin matches one of the retrieved results or may indicate that the pin is a new item. If the collector indicates that the pin is a retrieved result, the geo-matching application 108 may augment the data associated with the pin and add it to the collection. If the collector indicates that the pin is new/not in a retrieved image or collection, s/he may add information and re-run the search or may add the pin to the database of pins (or other collectable items).

Figure 3C:
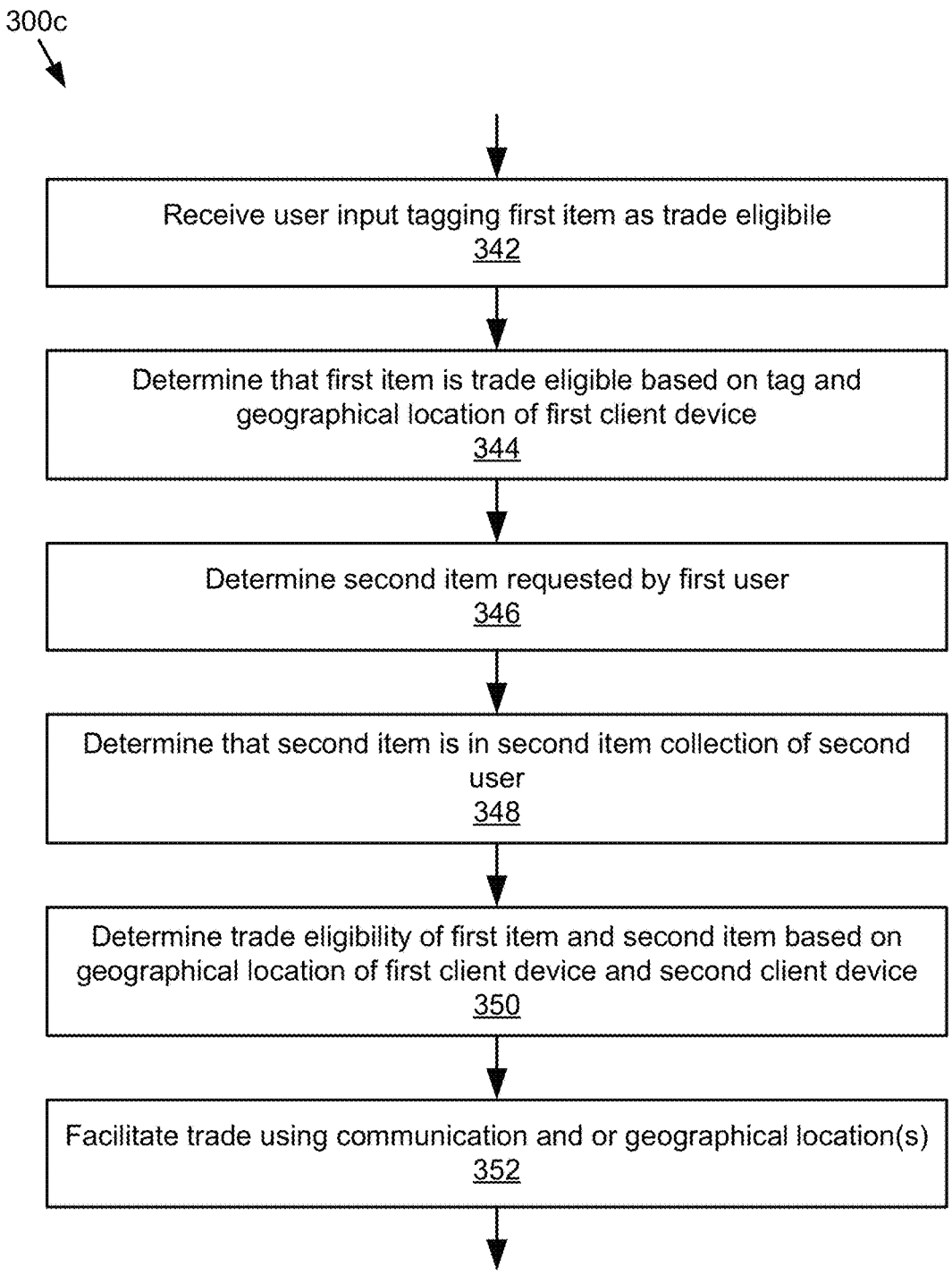
FIG. 3C is a flowchart of an example method for automatically determining an item, second user, collection, or otherwise matching a trade.

FIG. 3C is a flowchart of an example method 300c for automatically determining an item, second user, collection, or otherwise matching a trade. For instance, FIG. 3C illustrates an example method of determining the trade eligibility of an item or user.

At 342, the geo-matching application 108 receive a user input tagging the first item as trade eligible. For example, as illustrated in the example interfaces of FIG. 5E or 5F, a user may mark an item as eligible for in person trade, marketplace trade, or sale. Other details such as preferred items for trade, prices, shipping, etc., may also be input.

At 344, the geo-matching application 108 may determine that the first item is trade eligible based on the tag and/or the geographical location of the first client device 106. For instance, in addition to or in place of the trade eligibility flag, a user, client device 106, or item may be eligible when the client device 106 is in a geofenced area.

At 346, the geo-matching application 108 may determine a second item requested by the first user. For instance, a user may request one or more pins (together or in the alternative), for example, in exchange for a tradeable pin. In some instances, a second user may offer an item whether or not requested by the first user, for example, as discussed above and illustrated in FIGS. 8A-8H.

At 348, the geo-matching application 108 may determine that the second item is in the second item collection of the second user. For example, the geo-matching application 108 may determine a collection of items of the second user, for example, it may determine one or more items of the second user that are offered for trade. The geo-matching application 108 may determine that an available/tradeable item of the second user is a requested item of the first user. In some instances, the trade eligibility of the item in the second item collection may also be used to determine the second item collection/second user.

In some implementations, the geo-matching application 108 may, upon determining a match or available requested item, automatically notify a user. For example, if a second user with a requested pin arrives in a theme park, the geo-matching application 108 may automatically notify the requesting user.

At 350, the geo-matching application 108 may determine a trade eligibility of the first item and the second item based on a geographical location of the first client device 106 and/or the geographical location of the second client device 106. For instance, the application server 122 may receive geographical data from a location sensor of the second client device 106 of the second user and determine that the second client device 106 is within a geofenced area based on the geographical data. If the first client device 106 is also within the geofenced area, the geo-matching application 108 may determine that the first and second user (e.g., the instances of the geo-matching application 108 or client devices 106) are eligible to trade items or, in other words, the items are trade eligible.

At 352, the geo-matching application 108 may facilitate a trade using communication between the first and second client device 106 and/or their geographical locations. For example, as discussed above and in reference to FIGS. 8A-8H and FIGS. 5A-5D, the geo-matching application 108 may facilitate communication, trade, and/or purchase of the collectable item. For instance, when a first and second user are matched for a trade, as discussed above, the geo-matching application 108 may provide communication, location data, or other details to one or both of the users to facilitate the trade.

Figure 3D:
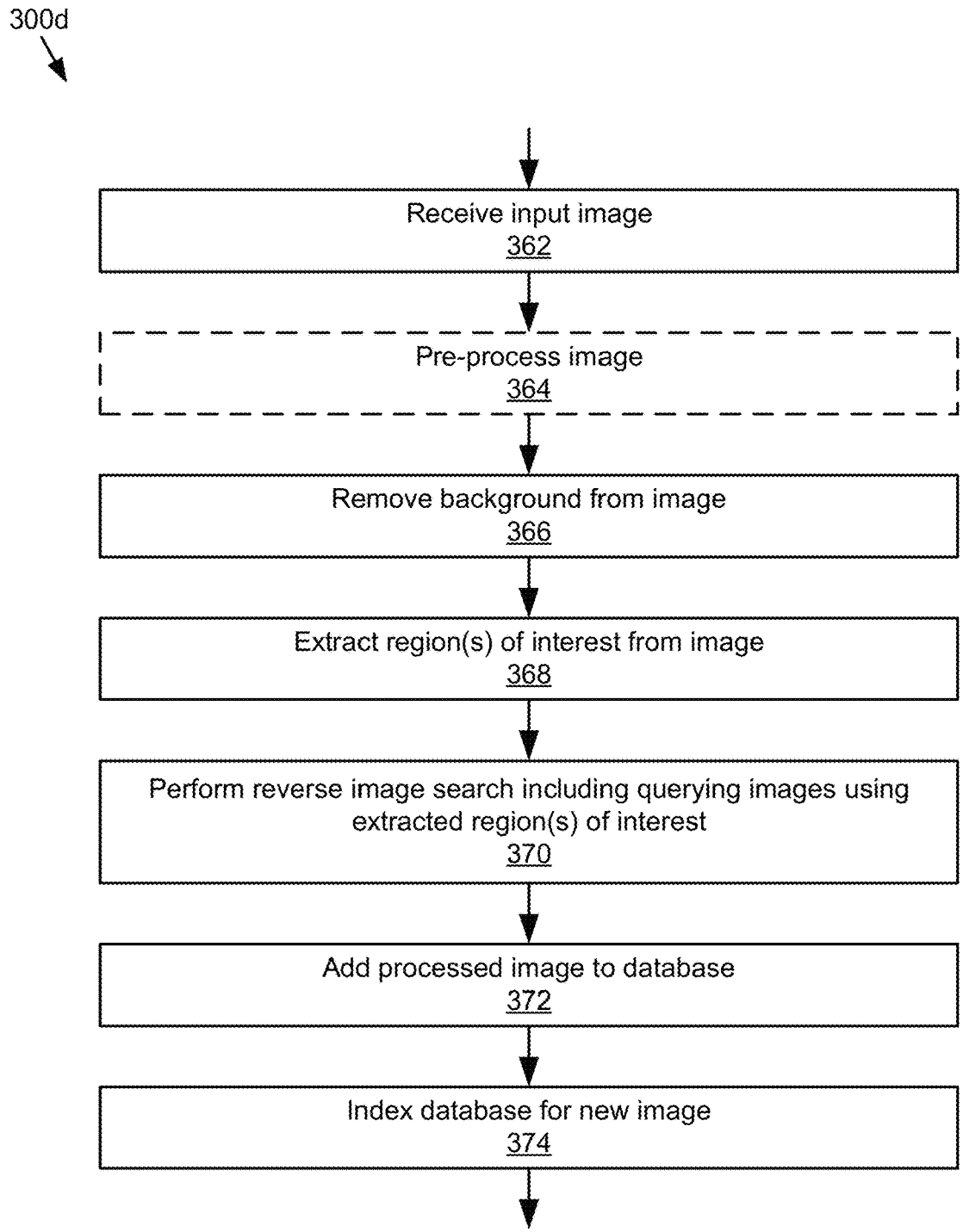
FIG. 3D is a flowchart of an example method for processing an image, for example, to extract features, query a database, and/or augment a database against which images may be searched.

FIG. 3D is a flowchart of an example method 300d for processing an image, for example, to extract features, query a database, and/or augment a database against which images may be searched.

At 362, the geo-matching application 108 may receive an input image. For example, the geo-matching application 108 may receive a scanned image, as described in reference to FIG. 3B.

At 364, the geo-matching application 108 may pre-process the input image. In some implementations, the geo-matching application 108 may perform pre-processing operations for improving analysis of an image. For instance, the geo-matching application 108 may convert the image to an array such as a NumPy array. The geo-matching application 108 may rescale, transform, crop, or otherwise resize the height and/or width of the image, for example, to be at a defined aspect ratio or resolution. In some implementations, the geo-matching application 108 may convert the image or array to tensors. In some implementations, the geo-matching application 108 may change a color space (e.g., RGB colors to BRG colors) and/or normalize the image, such as by converting the image from a first range (e.g., [0,255]) to a second range (e.g., [0,1]).

At 366, the geo-matching application 108 may remove a background of an item from the image. In some implementations, the geo-matching application 108 may use the U2Net Python machine learning model to remove a background of the image (e.g., the array or tensors of step 364). In some implementations, the geo-matching application 108 may use another machine learning model to remove the background.

The geo-matching application 108 may perform analytics on the background removal process, which may be used, for example, to further train the model and/or test its performance. For instance, the geo-matching application 108 may determine the time taken to remove the background and may save the results to a test results folder for later performance analysis.

At 368, the geo-matching application 108 may extract one or more regions of interest from the image. For instance, the geo-matching application 108 may extract feature vectors of the foreground (e.g., after removing the background, as described above) of the image.

In some implementations, the geo-matching application 108 may convert the image to grayscale using defined thresholds. In some instances, the geo-matching application 108 may remove noise, for example, using various morphology operations. In some instances, the geo-matching application 108 may find the maximum area contour of the foreground, for example, of the processed image (e.g., the grayscale and noise-reduced foreground image). In some instances, the geo-matching application 108 may crop and save the maximum area contour, for example, for further processing.

In some implementations, the geo-matching application 108 may extract other features, such as the shape, image size, flattened features, color, contours, or other features of the image (e.g., of the foreground).

At 370, the geo-matching application 108 may perform a reverse image search including querying images using the extracted region(s) of interest. For example, the geo-matching application 108 may create an image as a lookup image and use the image in a reverse search, such as against a database of related images, although other implementations are possible for finding one or more matching/candidate images or items.

In some instances, if a background of the image was removed, the image may be searched against other images with removed backgrounds. In some instances, if a background of the image was not removed, the image may be searched against images without removed backgrounds.

In some implementations, the geo-matching application 108 may define a search using a feature vector. The query creation may use feature mappings, various image properties, and the feature vector in the search query. For example, the geo-matching application 108 may use various features, such as input shape, size, array, flattened and/or normalized features, or other extracted features. In some implementations, the search query may additionally or alternatively be based on size, image source, image ID, script score, etc. For example, the geo-matching application 108 may match features using cosine similarity (e.g., to match a query vector with a feature vector).

In some implementations, a similarity of a given image ID to a second image (e.g., in a database) may have a score. The geo-matching application 108 may return candidate items or images having a threshold similarity score or a defined quantity (e.g., four) items/images that are most similar.

The geo-matching application 108 may identify similar images to the received image or, more specifically, the geo-matching application 108 may identify items in images in a database that are most similar to an item in the received image using the above operations. The geo-matching application 108 may determine additional information (e.g., as at 324-328) associated with the identified images in the database. For example, the geo-matching application 108 may identify one or more candidate items in the database and may retrieve associated information, such as item title, size, associated series (e.g., as in a series of enamel pins), or other attributes noted elsewhere herein, for example.

In some implementations, at 372, the geo-matching application 108 may add the item in the received image to the database, for example, to further train the item matching models and/or augment the selection of items in the database. For instance, as described above, the geo-matching application 108 may receive additional attributes or features describing the item in the received image from a user, for example, when adding a new item, as described above.

In some implementations, at 374, the geo-matching application 108 may index the database or otherwise add the new item to the index. For instance, the geo-matching application 108 may use the image ID (which may be generated by the geo-matching application 108) and its feature vector when indexing, adding to the database, etc.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system 100 and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats. Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
identifying, by one or more processors, a geofenced area where trades are allowed;
determining, by the one or more processors, that a first client device and a second client device are simultaneously within the geofenced area;
receiving, by a graphical user interface displayed on the first client device, initial collection attributes describing a first item collection, the first item collection being associated with a first user in one or more databases stored in one or more computer-accessible memories;
determining, by the one or more processors, a first attribute of a first item associated with the first item collection;
determining, by the one or more processors, a trade eligibility of the first item based on the first client device being within the geofenced area;
identifying, by the one or more processors, a second user based on the first attribute, the trade eligibility of the first item, and one or more attributes of the second user, the one or more attributes of the second user including that the second client device of the second user is within the geofenced area simultaneously with the first client device, the geofenced area being defined independently from a first location of the first client device and a second location of the second client device; and
providing, by the one or more processors, communication between the first client device and the second client device of the second user.

2. The computer-implemented method of claim 1, wherein determining the first attribute of the first item includes:
scanning, by an optical sensor of the first client device, the first item;
determining an initial attribute of the first item using the scan of the first item;
comparing the initial attribute of the first item against an item database in the one or more computer-accessible memories;
identifying one or more candidate items based on the comparison of the initial attribute with the item database;
receiving a user input, via the graphical user interface, confirming an identity of the first item from among the one or more candidate items; and
determining the first attribute of the first item based on the received user input confirming the identity of the first item.

3. The computer-implemented method of claim 1, wherein determining the trade eligibility of the first item includes:
receiving a user input tagging the first item as trade eligible;
receiving geographical data from a location sensor of the first client device; and
setting the first item as trade eligible based on the user input and the geographical data identifying the first client device being within the geofenced area.

4. The computer-implemented method of claim 1, wherein identifying the second user includes:
receiving geographical data from a location sensor of the second client device of the second user;
determining that the second client device is currently within the geofenced area based on the geographical data; and determining that the first client device currently is within the geofenced area.

5. The computer-implemented method of claim 4, wherein identifying the second user includes:
   determining a second item requested by the first user via an input into the graphical user interface;
   determining one or more items in a second item collection associated with the second user in the one or more databases in the one or more computer-accessible memories; and
   determining that the second item is among the one or more items in the second item collection based on the one or more databases.

6. The computer-implemented method of claim 1, wherein providing the communication between the first client device and the second client device includes:
   automatically providing, by the one or more processors, the first location of the first client device to the second client device in response to the first client device and the second client device being within the geofenced area and a trade acknowledgement by the first user and the second user.

7. The computer-implemented method of claim 6, wherein providing the communication between the first client device and the second client device includes:
   processing a back-end transaction for a trade of the first item; and
   automatically updating, by the one or more processors, the one or more databases in the one or more computer-accessible memories to reflect an update to the first item collection.

8. The computer-implemented method of claim 1, wherein the first item includes an enamel pin.

9. The computer-implemented method of claim 1, further comprising:
   receiving, by an optical sensor of the first client device, an image of the first item;
   processing the image of the first item to determine a query vector;
   matching the query vector against a database in the one or more computer-accessible memories describing a plurality of items to determine a candidate item;
   receiving a user input from the first user via the graphical user interface, the user input confirming that the first item matches the candidate item;
   retrieving data describing the candidate item from the database;
   adding the first item to the first item collection associated with the first user using the data describing the candidate item; and
   automatically matching the first item with the second user based on the trade eligibility.

10. The computer-implemented method of claim 1, wherein:
    determining the trade eligibility of the first item is based on the first client device being within a determined geographical area.

11. The computer-implemented method of claim 10, wherein:
    identifying the second user is further based on the second client device being within the determined geographical area.

12. A system comprising:
    one or more processors; and
    one or more memories storing instructions that, when executed by the one or more processors cause the system to:
    identify, by the one or more processors, a geofenced area where trades are allowed;
    determine, by the one or more processors, that a first client device and a second client device are simultaneously within the geofenced area;
    receive, by a graphical user interface displayed on the first client device, initial collection attributes describing a first item collection, the first item collection being associated with a first user in one or more databases stored in one or more computer-accessible memories;
    determine, by the one or more processors, a first attribute of a first item associated with the first item collection;
    determine, by the one or more processors, trade eligibility of the first item based on the first client device being within the geofenced area;
    identify, by the one or more processors, a second user based on the first attribute, the trade eligibility of the first item, and one or more attributes of the second user, the one or more attributes of the second user including that the second client device of the second user is within the geofenced area simultaneously with the first client device, the geofenced area being defined independently from a first location of the first client device and a second location of the second client device; and
    provide, by the one or more processors, communication between the first client device and the second client device of the second user.

13. The system of claim 12, wherein determining the first attribute of the first item includes:
    scanning, by an optical sensor of the first client device, the first item;
    determining an initial attribute of the first item using the scan of the first item;
    comparing the initial attribute of the first item against an item database in the one or more computer-accessible memories;
    identifying one or more candidate items based on the comparison of the initial attribute with the item database;
    receiving a user input, via the graphical user interface, confirming an identity of the first item from among the one or more candidate items; and
    determining the first attribute of the first item based on the received user input confirming the identity of the first item.

14. The system of claim 13, wherein providing the communication between the first client device and the second client device includes:
    automatically providing, by the one or more processors, the first location of the first client device to the second client device in response to the first client device and the second client device being within the geofenced area and a trade acknowledgement by the first user and the second user.

15. The system of claim 14, wherein providing the communication between the first client device and the second client device includes:
    processing a back-end transaction for a trade of the first item; and
    automatically updating, by the one or more processors, the one or more databases in the one or more computer-accessible memories to reflect an update to the first item collection.

16. The system of claim 15, wherein:
   determining the trade eligibility of the first item is based on the first client device being within a determined geographical area; and
   identifying the second user is further based on the second client device being within the determined geographical area.

17. The system of claim 12, wherein determining the trade eligibility of the first item includes:
   receiving a user input tagging the first item as trade eligible;
   receiving geographical data from a location sensor of the first client device; and
   setting the first item as trade eligible based on the user input and the geographical data identifying the first client device being within the geofenced area.

18. The system of claim 12, wherein identifying the second user includes:
   receiving geographical data from a location sensor of the second client device of the second user;
   determining that the second client device is currently within the geofenced area based on the geographical data; and
   determining that the first client device is currently within the geofenced area.

19. The system of claim 18, wherein identifying the second user includes:
   determining a second item requested by the first user via an input into the graphical user interface;
   determining one or more items in a second item collection associated with the second user in the one or more databases in the one or more computer-accessible memories; and
   determining that the second item is among the one or more items in the second item collection based on the one or more databases.

20. A computer-implemented method comprising:
   identifying, by one or more processors, a geofenced area where trades are allowed;
   determining, by the one or more processors, that a first client device and a second client device are simultaneously within the geofenced area;
   receiving, by a graphical user interface displayed on the first client device, initial collection attributes describing a first item collection, the first item collection being associated with a first user in one or more databases stored in one or more computer-accessible memories;
   determining, by one or more processors, a first attribute of a first item associated with the first item collection;
   determining, by the one or more processors, a trade eligibility of the first item including:
   receiving a user input tagging the first item as trade eligible;
      receiving geographical data from a location sensor of the first client device; and
      setting the first item as trade eligible based on the user input and the geographical data identifying the first client device being within the geofenced area;
   identifying, by the one or more processors, a second user based on the first attribute, the trade eligibility of the first item, and one or more attributes of the second user including:
      receiving geographical data from a location sensor of the second client device of the second user; and
      determining that the second client device is within the geofenced area simultaneously with the first client device based on the geographical data from the second client device, the geofenced area being defined independently from a first location of the first client device and a second location of the second client device; and
   providing, by the one or more processors, communication between the first client device and the second client device of the second user.

\* \* \* \* \*